(12) United States Patent
Mannion

(10) Patent No.: US 12,081,815 B2
(45) Date of Patent: *Sep. 3, 2024

(54) METHODS AND APPARATUS TO MONITOR ON-DEMAND MEDIA

(71) Applicant: The Nielsen Company (US), LLC, New York, NY (US)

(72) Inventor: Nicholas Mannion, Towson, MD (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,535

(22) Filed: Oct. 28, 2022

(65) Prior Publication Data

US 2023/0046011 A1 Feb. 16, 2023

Related U.S. Application Data

(63) Continuation of application No. PCT/US2021/029439, filed on Apr. 27, 2021, which
(Continued)

(51) Int. Cl.
*H04N 21/24* (2011.01)
*G06F 16/483* (2019.01)
(Continued)

(52) U.S. Cl.
CPC ....... *H04N 21/2408* (2013.01); *G06F 16/483* (2019.01); *H04N 21/252* (2013.01); *H04N 21/44204* (2013.01)

(58) Field of Classification Search
CPC ............. H04N 21/2408; H04N 21/252; H04N 21/44204; H04N 21/23418;
(Continued)

(56) References Cited

U.S. PATENT DOCUMENTS 8,745,206 B1\* 6/2014 Chang ................ H04N 21/6581
709/224
11,470,367 B2\* 10/2022 Mannion .......... H04N 21/47202
(Continued)

FOREIGN PATENT DOCUMENTS

KR 20110090494 8/2011

OTHER PUBLICATIONS

International Searching Authority, "International Preliminary Report on Patentability," issued in connection with International Patent Application No. PCT/US2021/029439, issued Oct. 27, 2022, 5 pages.
(Continued)

*Primary Examiner* — John R Schnurr

(57) ABSTRACT

Methods, apparatus, systems, and articles of manufacture are disclosed to monitor on-demand media. An example apparatus populates a reference library with a reference profile for on-demand media in response to publication of the on-demand media by generating one or more reference signatures for the on-demand media, collecting reference metadata associated with the on-demand media, and associating the one or more reference signatures and the reference metadata in the reference library to generate the reference profile. Additionally, the example apparatus collects one or more sample signatures generated at a media presentation environment. The example apparatus also records an exposure for the on-demand media based on a match between the one or more sample signatures and the one or more reference signatures.

21 Claims, 9 Drawing Sheets

Related U.S. Application Data is a continuation of application No. 16/863,210, filed on Apr. 30, 2020, now Pat. No. 11,470,367.

(51) Int. Cl.
   *H04N 21/25* (2011.01)
   *H04N 21/442* (2011.01)

(58) Field of Classification Search
   CPC ....... H04N 21/25891; H04N 21/44008; H04N 21/6582; H04N 21/812; H04N 21/47202; G06F 16/483; H04H 2201/90; H04H 60/29

See application file for complete search history.

(56) References Cited

U.S. PATENT DOCUMENTS

| | | | |
|---|---|---|---|
| 2007/0124416 | A1 | 5/2007 | Casey et al. |
| 2008/0147780 | A1 | 6/2008 | Trevor et al. |
| 2008/0229374 | A1* | 9/2008 | Mick ............... G06F 16/78 725/93 |
| 2008/0294647 | A1* | 11/2008 | Ramaswamy ........ G06F 16/958 |
| 2011/0088052 | A1 | 4/2011 | Ramaswamy et al. |
| 2014/0280773 | A1 | 9/2014 | Sharp |
| 2017/0048566 | A1 | 2/2017 | Srinivasan |
| 2017/0302996 | A1 | 10/2017 | Besehanic |
| 2018/0146255 | A1 | 5/2018 | Phillips et al. |

OTHER PUBLICATIONS

Podtrac, "About the Podcast Industry Audience Rankings," retrieved on Jul. 31, 2020 from http://analytics.podtrac.com/about-the-podcast-rankings (6 pages).

Podtrac, "Who's Listening?," retrieved on Jul. 31, 2020 from http://analytics.podtrac.com/podcast-demographics (4 pages).

Podtrac, "Certified Third Party Audience Data Can You Rely on," retrieved on Jul. 31, 2020 from http://analytics.podtrac.com/podcast-measurement (4 pages).

Podtrac, "Welcome To Podtrac: the Standard for Podcast Analytics," retrieved on Jul. 31, 2020 from http://analytics.podtrac.com (6 pages).

Podtrac, "Register Your Podcast With Podtrac," retrieved on Jul. 31, 2020 from http://analytics.podtrac.com/publisher-services (5 pages).

Podtrac, "Podcast Industry Audience Rankings," retrieved on Jul. 31, 2020 from http://analytics.podtrac.com/industry-rankings (3 pages).

Podtrac, "Top Publishers," retrieved on Jul. 31, 2020 from http://analytics.podtrac.com/podcast-publisher-rankings (5 pages).

Podtrac, "Top Podcasts," retrieved on Jul. 31, 2020 from http://analytics.podtrac.com/podcast-rankings (5 pages).

Podtrac, "Top Podcasts by Category," retrieved on Jul. 31, 2020 from http://analytics.podtrac.com/top-podcasts-by-cat-sample (5 pages).

International Searching Authority, "International Search Report", issued in connection with International Application No. PCT/US2021/029439, dated Aug. 10, 2021 (3 pages).

International Searching Authority, "Written Opinion", issued in connection with International Application No. PCT/US2021/029439, dated Aug. 10, 2021 (4 pages).

United States Patent and Trademark Office, "Non-Final Office Action," issued in connection with U.S. Appl. No. 16/863,210, filed Apr. 5, 2021, 13 pages.

United States Patent and Trademark Office, "Final Office Action," issued in connection with U.S. Appl. No. 16/863,210, filed Aug. 30, 2021, 15 pages.

United States Patent and Trademark Office, "Non-Final Office Action," issued in connection with U.S. Appl. No. 16/863,210, filed Feb. 17, 2022, 14 pages.

United States Patent and Trademark Office, "Notice of Allowance and Fee(s) Due," issued in connection with U.S. Appl. No. 16/863,210, filed Jun. 2, 2022, 10 pages.

* cited by examiner

METHODS AND APPARATUS TO MONITOR ON-DEMAND MEDIA

CROSS REFERENCE TO RELATED APPLICATIONS

This patent arises from a continuation of International Patent Application No. PCT/US2021/029439, filed Apr. 27, 2021, which is a continuation of U.S. patent application Ser. No. 16/863,210, now U.S. Pat. No. 11,470,367, filed Apr. 30, 2020. International Patent Application No. PCT/US2021/029439 and U.S. patent application Ser. No. 16/863,210 are hereby incorporated herein by reference in their entireties. Priority to International Patent Application No. PCT/US2021/029439 and U.S. patent application Ser. No. 16/863,210 is hereby claimed.

FIELD OF THE DISCLOSURE

This disclosure relates generally to media monitoring, and, more particularly, to methods and apparatus to monitor on-demand media.

BACKGROUND

On-demand media includes media that can be downloaded via a request and that is usually not broadcast via a live stream. For example, on-demand media includes complete series (e.g., podcasts), segments of series (e.g., portions of podcasts), and standalone programs (e.g., standalone stories, clips, etc.). Also, on-demand media includes music, video, comedy, etc. On-demand media platforms include Spotify®, AmazonMusic®, Apple Podcasts®, Pandora®, YouTube®, among others.

Figure 1:
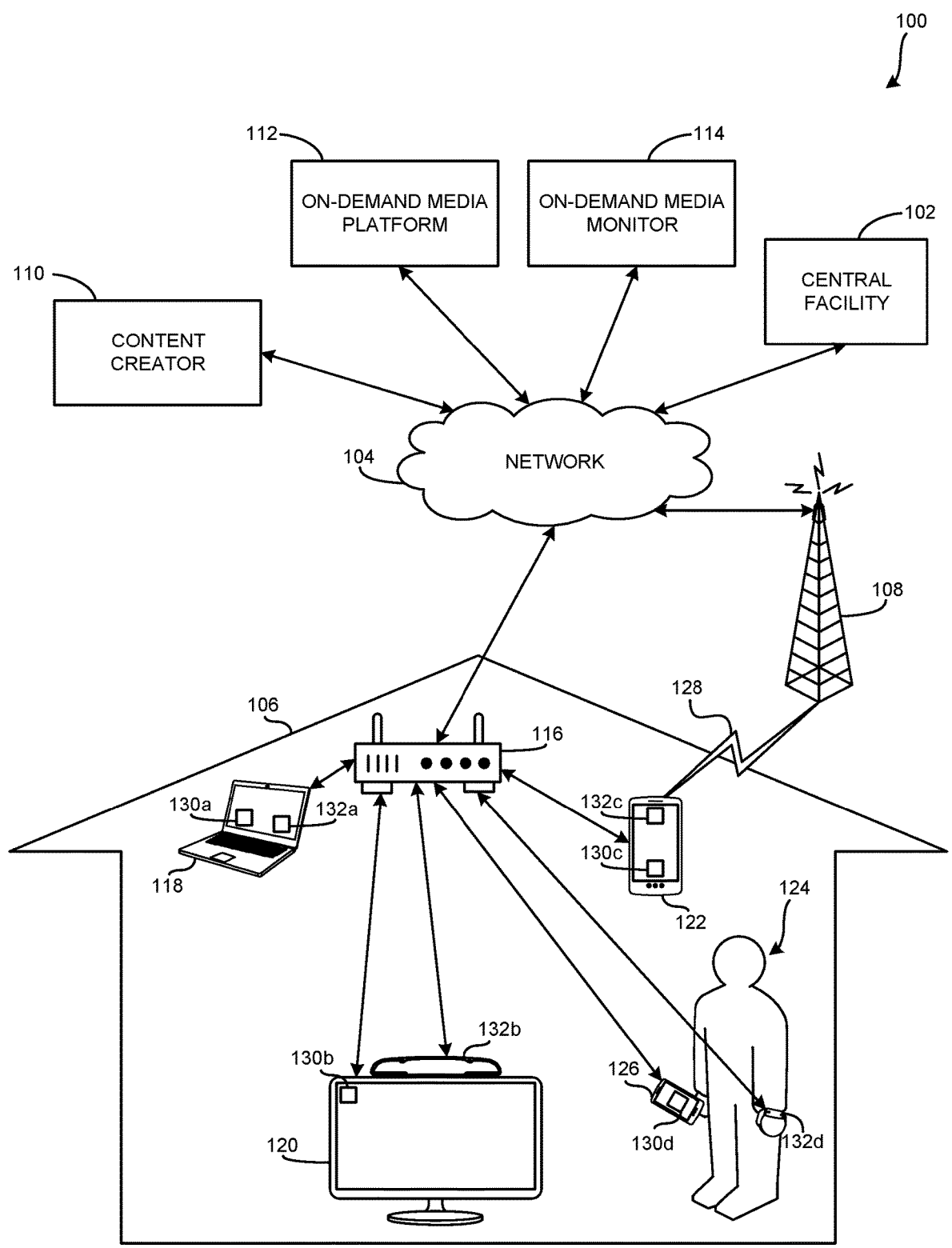
FIG. 1 is a block diagram of an example environment in which an example central facility monitors on-demand media presented at one or more devices in an example network.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

On-demand media includes media that can be downloaded via a request and is usually not broadcast via a live stream. For example, on-demand media includes complete series (e.g., podcasts), segments of series (e.g., portions of podcasts), and standalone programs (e.g., standalone stories, clips, etc.). Also, on-demand media includes music, video, comedy, etc. On-demand media platforms include Spotify®, AmazonMusic®, Apple Podcasts®, Pandora®, YouTube®, among others.

Some prior audience measurement systems that monitor on-demand media utilize techniques based on monitoring server logs or relying on redirect services to identify downloads of the on-demand media. For example, podcasters, other on-demand media providers, and/or, more generally, content creators, distribute content via really simple syndication (RSS) feeds. RSS feeds include universal resource locators (URLs) and metadata associated with on-demand media (e.g., show name, season, episode, etc.). Content creators can upload (e.g., publish) on-demand media to a hosting site. For example, a content creator can upload a podcast to Spotify® which creates an associated RSS feed. End-users and content aggregators (e.g., Netflix®, Hulu®, YouTube®, Spotify®, etc.) subscribe to these RSS feeds and are updated in real-time when new content is made available (e.g., published). Some prior audience measurement systems can identify when an end-user downloads on-demand media via RSS feeds.

However, identifying whether on-demand media has been downloaded does not provide a measurement of whether an end-user was actually exposed to (e.g., listened to) the on-demand media. Also, identifying whether on-demand media has been downloaded does not provide any insight with respect to characteristics (e.g., demographics, occupation, etc.) of end-users who were exposed to the on-demand media. Examples disclosed herein include an audience measurement entity that subscribes to RSS feeds of clients (e.g., content creators, on-demand media providers, podcasters, etc.) during onboarding of clients. For example, a podcaster can specify the RSS feed associated with the hosting site where the podcaster's on-demand media is published and the audience measurement entity can augment that RSS feed with a redirect that provides the audience measurement entity insight with respect to downloads and/or metadata associated with the on-demand media.

Examples disclosed herein include an aggregator service that, when on-demand media is published, downloads the on-demand media, generates one or more signatures for the on-demand media, collects metadata (e.g., show name, season, episode, etc.) associated with the on-demand media, and associates and stores the signature(s) and/or the metadata at a data storage (e.g., a media data lake, a media database, etc.). Examples disclosed herein enable on-demand media measurement via signature matching of downloaded on-demand media. Examples disclosed herein additionally measure on-demand media in near real-time.

Examples disclosed herein leverage a large data source (e.g., a big data framework) in combination with high quality panelist data to identify demographic information associated with end-users and/or whether end-users are actually exposed to (e.g., listen to) the on-demand media. For example, the systems, methods, and apparatus disclosed herein include an audience measurement entity (e.g., an on-demand media monitor) subscribed to one or more RSS feeds associated with the hosting site where on-demand media is published. By onboarding clients via RSS feeds, examples disclosed herein are platform and/or player agnostic. That is, examples disclosed herein can measure podcast downloads regardless of the platform and/or the player that is consuming the podcast. For example, the disclosed systems, methods, and apparatus measure downloads on Apple® platforms (e.g., Apple Podcasts®) without engaging with Apple®.

Also, by onboarding clients via RSS feeds, examples disclosed herein enable ease of audience measurement. That is, the systems, methods, and apparatus disclosed herein reduce the barrier to entry for content creators (e.g., a podcaster) to be included in audience measurement. Examples disclosed herein include content creators registering with the audience measurement entity (e.g., an on-demand media monitor) and the content creators and/or the audience measurement entity prefixing the download URL (e.g., the hosting site) associated with the RSS feed of the on-demand media with a redirect URL associated with the audience measurement entity (e.g., an on-demand media monitor). In doing so, examples disclosed herein route download requests for on-demand media through the servers of the audience measurement entity (e.g., an on-demand media monitor), which enables the audience measurement entity monitors the on-demand media.

Examples disclosed herein convert metrics of on-demand media downloads to metrics of average monthly audience metrics and identify on-demand media exposure versus on-demand media downloads. Some examples disclosed herein measure on-demand media via signatures to catalog each new releases of on-demand media and create a profile of the on-demand media. Example profiles disclosed herein are stored in a data storage (e.g., a media data lake) or other reference system in near real-time to be matched against sample signatures received from panelists. Examples disclosed herein ensure the ease of client onboarding while providing a higher quality measurement solution.

FIG. 1 is a block diagram of an example environment 100 in which an example central facility 102 monitors on-demand media presented at one or more devices in an example network 104. The example environment 100 includes the example central facility 102, the example network 104, an example measurement location 106, an example wireless communication system 108, an example content creator 110, an example on-demand media platform 112, and an example on-demand media monitor 114. The example measurement location 106 includes an example access point 116, an example first media device 118, an example second media device 120, an example third media device 122, an example panelist 124, and an example fourth media device 126. In the example of FIG. 1, the example third media device 122 is coupled to the wireless communication system 108 via an example wireless communication link 128.

In the illustrated example of FIG. 1, the example first media device 118, the example second media device 120, the example third media device 122, and the example fourth media device 126 include an example first application 130a, an example second application 130b, an example third application 130c, and an example fourth application 130d, respectively. In the example of FIG. 1, the example first media device 118 includes an example first meter 132a and the example second media device 120 is coupled to an example second meter 132b. In the example of FIG. 1, the example third media device 122 includes an example third meter 132c and the example panelist 124 is wearing an example fourth meter 132d.

In the illustrated example of FIG. 1, each of the central facility 102, the wireless communication system 108, the content creator 110, the on-demand media platform 112, and the on-demand media monitor 114 is in communication with the network 104. In the example of FIG. 1, the access point 116 is in communication with the network 104. Additionally, the first media device 118, the second media device 120, the third media device 122, the fourth media device 126, the second meter 132b, and the fourth meter 132d are in communication with the access point 116.

In the illustrated example of FIG. 1, the central facility 102 can be implemented by one or more servers (e.g., a datacenter) that collect and process panelist information and/or media identification information (e.g., fingerprints) obtained from and/or associated with the measurement location 106. In the illustrated example, the central facility 102 is associated with an audience measurement entity. In the illustrated example, the central facility 102 downloads on-demand media hosted at the on-demand media platform 112 and/or collects metadata associated with on-demand media via one or more RSS feeds to generate a reference library. For example, the central facility 102 can subscribe to one or more RSS feeds. In this manner, the central facility 102 can download on-demand media, profile the on-demand media (e.g., via fingerprinting), collect metadata associated with the on-demand media, and/or store the on-demand media, the on-demand media profile, and/or the on-demand media metadata upon publication of the on-demand media. In some examples, the central facility 102 can implement the on-demand media monitor 114. In examples disclosed herein, media profiles include a digital summary of the media (e.g., signature(s)) and metadata associated with the media.

In the illustrated example of FIG. 1, the central facility 102 analyzes the panelist information and/or media identification information to identify whether a panelist (e.g., the panelist 124) has been exposed to (e.g., listened to) on-demand media. Using panelist information and media identification information collected from measurement locations (e.g., the measurement location 106), and reference data (e.g., profiles of on-demand media, on-demand media metadata, etc.), the central facility 102 can generate reports including metrics associated with the on-demand media. For example, metrics associated with the on-demand media can include how many people were exposed to (e.g., listened to) the on-demand media, the demographic makeup of the audience, how much of the on-demand media was presented to what portion of the audience members (e.g., length of time the audience members played the on-demand media back, 40% of audience members consumed the first 20 minutes of the on-demand media, etc.), the types of devices that presented the on-demand media, among others. In examples disclosed herein, on-demand media can include programs (e.g., Serial® produced by This American Life®), a season (e.g., season one), an episode (e.g., episode one "The Alibi"), among others.

In some examples, the example central facility 102 and/or the on-demand media monitor 114 augments one or more URLs associated with RSS feeds with a prefix URL to redirect download requests to the central facility 102 and/or the on-demand media monitor 114. For example, the central facility 102 and/or the on-demand media monitor 114 can implement a mechanism (e.g., via a secure user account, a request/reply protocol, etc.) to provide clients (e.g., content creators) with the prefix URL and/or instructions for how to prefix the URL associated with the client's RSS feed with the prefix URL. In this manner, when an end-user and/or an end-user device (e.g., a media device, and/or any other client device) requests to download the on-demand media, the end-user and/or end-user device is temporarily redirected to the example central facility 102 and/or the on-demand media monitor 114, which records the request to download the on-demand media thereby crediting the on-demand media. After being redirected to the central facility 102 and/or the on-demand media monitor 114, the end-user and/or end-user device is directed to the URL associated with the RSS feed and downloads the on-demand media.

In the illustrated example of FIG. 1, the central facility 102 sends and/or receives Internet messages (e.g., a Hyper-Text Transfer Protocol (HTTP) request(s)) that include panelist information from the measurement location 106, media identification information (e.g., fingerprints) from the measurement location 106, on-demand media hosted at the on-demand media platform 112, metadata associated with on-demand media, and/or reports including metrics associated with the on-demand media. Additionally or alternatively, any other method(s) to send and/or receive panelist information and/or media identification information (e.g., fingerprints) from the measurement location 106, on-demand media hosted at the on-demand media platform 112, metadata associated with on-demand media, and/or reports including metrics associated with the on-demand media may be used such as, for example, an HTTP Secure protocol (HTTPS), a file transfer protocol (FTP), a secure file transfer protocol (SFTP), etc.

In some examples, the example central facility 102 implements example means for audience measurement. The audience measurement means is implemented by executable instructions such as that implemented by at least blocks 402, 404, 406, 408, 410, 412, and 414 of FIG. 4; at least blocks 502, 504, 506, and 508 of FIG. 5; and/or at least blocks 602, 604, 606, 608, 610, 612, 614, 616, 618, 620, 622, 624, 626, 628, 630, and 632 of FIG. 6. The executable instructions of blocks 402, 404, 406, 408, 410, 412, and 414 of FIG. 4; blocks 502, 504, 506, and 508 of FIG. 5; and/or blocks 602, 604, 606, 608, 610, 612, 614, 616, 618, 620, 622, 624, 626, 628, 630, and 632 of FIG. 6 may be executed on at least one processor such as the example processor 812 of FIG. 8. In other examples, the audience measurement means is implemented by hardware logic, hardware implemented state machines, logic circuitry, and/or any other combination of hardware, software, and/or firmware.

The example network 104 of the illustrated example of FIG. 1 is the Internet. However, the example network 104 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 104 enables the example central facility 102 to be in communication with the measurement location 106, the content creator 110, the on-demand media platform 112, the on-demand media monitor 114, and/or other measurement locations. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

The example measurement location 106 of the illustrated example of FIG. 1 is a panelist household. However, the measurement location 106 may be any other location, such as, for example a non-panelist household, a manufacturing environment, an office, an airport, a library, an Internet café, etc. While in the illustrated example of FIG. 1 a single measurement location is shown, any number and/or type(s) of measurement locations may be used.

The panelist household may include one or more panelists (e.g., the panelist 124). The panelists are users registered on panels maintained by a ratings entity (e.g., an audience measurement entity) that owns and/or operates a ratings entity subsystem (e.g., the central facility 102). Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

People (e.g., households, organizations, etc.) register as panelists (e.g., the panelist 124) via, for example, a user interface presented on a media device (e.g., via a website). People may be recruited as panelists in additional or alternative manners such as, for example, via a telephone interview, by completing an online survey, etc. Additionally or alternatively, people may be contacted and/or enlisted to join a panel using any desired methodology (e.g., random selection, statistical selection, phone solicitations, Internet advertisements, surveys, advertisements in shopping malls, product packaging, etc.). In other examples, the measurement location 106 may correspond to people or organizations that subscribe to a service provided by an audience measurement entity.

In the illustrated example of FIG. 1, the content creator 110 is an entity that generates content. For example, the content creator 110 can include an individual, a group on individuals, a company, among others. The content created by the content creator 110 can include a variety of content including on-demand media. For example, the content creator 110 can create podcasts. The content creator 110 can register with the on-demand media platform 112 to publish content (e.g., podcasts). Additionally or alternatively, the content creator 110 can register with the on-demand media monitor 114 and/or the central facility 102, and prefix the download URL provided by the on-demand media platform 112 (e.g., the URL associated with the RSS feed of the on-demand media) with a redirect (e.g., a prefix) URL associated with the on-demand media monitor 114 and/or the central facility 102. In some examples, the central facility 102 implements the on-demand media monitor 114. In some examples, the central facility 102 can be partnered with the on-demand media monitor 114 to obtain download metrics from the on-demand media monitor 114. In additional or alternative examples, the content creator 110 can register with the on-demand media monitor 114 and prefix the download URL provided by the on-demand media platform 112 (e.g., the URL associated with the RSS feed of the on-demand media) with a redirect (e.g., a prefix) URL associated with the central facility 102.

In the illustrated example of FIG. 1, the on-demand media platform 112 is associated with an entity that hosts on-demand media. For example, the on-demand media platform 112 can include Spotify®, AmazonMusic®, Apple Podcasts®, Pandora®, YouTube®, among others. The on-demand media platform 112 can host on-demand media published by the content creator 110. For example, the on-demand media platform 112 creates an RSS feed associated with the on-demand media produced by the content creator 110. End-users and content aggregators (e.g., Netflix®, Hulu®, YouTube®, etc.) subscribe to the RSS feed and are updated in real-time when new content is made available (e.g., published). In some examples, the content creator 110 re-publishes previously published on-demand media. For example, a content creator may re-publish on-demand media as a remastered copy, to make a factual correction, when changing on-demand media platforms (e.g., hosting sites), among others.

In the illustrated example of FIG. 1, the on-demand media monitor 114 is an entity that monitors on-demand media via RSS redirects. For example, the on-demand media monitor 114 can be associated with an audience measurement entity. The on-demand media monitor 114 can be implemented by one or more servers. In some examples, the central facility 102 can implement the on-demand media monitor 114. Additionally or alternatively, the on-demand media monitor 114 can be partnered with the central facility 102 to provide download metrics to the central facility 102.

In the illustrated example of FIG. 1, the on-demand media monitor 114 can identify when an end-user downloads on-demand media via RSS redirects. For example, the on-demand media monitor 114 can augment one or more URLs associated with RSS feeds with a prefix URL to redirect download requests to the on-demand media monitor 114. In additional or alternative examples, the on-demand media monitor 114 provides clients (e.g., content creators) with the prefix URL and/or instructions for how to prefix the URL associated with the client's RSS feed with the prefix URL. In this manner, when an end-user and/or an end-user device (e.g., a media device, and/or any other client device) requests to download the on-demand media, the end-user and/or end-user device is temporarily redirected to the example on-demand media monitor 114 which records the request to download the on-demand media thereby crediting the on-demand media. After being redirected to the on-demand media monitor 114, the end-user and/or end-user device is directed to the URL associated with the RSS feed and downloads the on-demand media.

In the illustrated example of FIG. 1, the access point 116 is an integrated router/modem combination. The access point 116 enables network communications of the measurement location 106 to reach the network 104. In some examples, the access point 116 is a digital subscriber line (DSL) modem, while in some other examples the access point 116 is a cable modem. In some examples, the access point 116 implements or otherwise includes a media converter that converts one communications medium (e.g., electrical communications, optical communications, wireless communications, etc.) into another type of communications medium. In some examples, the access point 116 is separate from a network gateway (e.g., a router, a link, a switch, etc.).

In the illustrated example of FIG. 1, the first media device 118 is a laptop computer. In additional or alternative examples, the first media device 118 can be a personal computer, a Mac® computer, and/or any other client device. In further examples, the first media device 118 is any device that receives a media input and outputs the media. The first media device 118 includes the first application 130a to present media (e.g., on-demand media such as podcasts) at the first media device 118. The first media device 118 includes the first meter 132a to monitor media presented at the first media device 118. In the example of FIG. 1, the first meter 132a is a software-based meter. In additional or alternative examples, the first meter 132a can be implemented by a physical meter.

In the illustrated example of FIG. 1, the second media device 120 is a television. For example, the second media device 120 can be an Internet-enabled television, a traditional television supplemented by a streaming service (e.g., Roku®, Amazon Fire®, etc.), and/or any other client device. The second media device 120 may present media sent from another media device (e.g., a smart phone, a tablet, etc.) via a wired or wireless connection to the media device, a wired or wireless connection to a media service provider, etc. The second media device 120 may present the media sent to it from another media device with supplementary media presentation devices such as speakers, projectors, additional screens, etc. The second media device 120 includes the second application 130b to present media (e.g., on-demand media such as podcasts) at the second media device 120. The second media device 120 is coupled to the second meter 132b that can monitor media presented at the second media device 120. In the example of FIG. 1, the second meter 132b is a physical meter (e.g., a personal people meter (PPM)). In additional or alternative examples, the second meter 132b can be implemented by a software-based meter implemented at the second media device 120.

In the illustrated example of FIG. 1, the third media device 122 is a smart phone. In additional or alternative examples, the third media device 122 can be an Apple® iPhone®, a Samsung Galaxy® phone, and/or any other client device. In further examples, the third media device 122 is any device that receives a media input and outputs the media. The third media device 122 includes the third application 130c to present media (e.g., on-demand media such as podcasts) at the third media device 122. The third media device 122 includes the third meter 132c to monitor media presented at the third media device 122. In the example of FIG. 1, the third meter 132c is a software-based meter. In additional or alternative examples, the third meter 132c can be implemented by a physical meter.

In some examples, the third media device 122 is unable to transmit information via the access point 116. For example, a server upstream of the access point 116 may not provide functional routing capabilities to permit the third media device 122 to access the network 104. In the illustrated example, the third media device 122 includes additional capabilities to communicate with the network 104. As shown in FIG. 1, the third media device 122 includes the capabilities to send information through the wireless communication system 108 (e.g., the cellular communication system) via the wireless communication link 128.

The example wireless communication link 128 of the illustrated example of FIG. 1 is a cellular communication link. However, any other method and/or system of communication may additionally or alternatively be used such as, for example, an Ethernet connection, a Bluetooth connection, a Wi-Fi connection, etc. Further, the wireless communication link 128 of FIG. 1 implements a cellular connection via a Global System for Mobile Communications (GSM). However, any other systems and/or protocols for communications may be used such as, for example, Time Division Multiple Access (TDMA), Code Division Multiple Access (CDMA), Worldwide Interoperability for Microwave Access (WiMAX), Long Term Evolution (LTE), etc.

In the illustrated example of FIG. 1, the fourth media device 126 is a tablet computer or any other type of mobile computing device. In additional or alternative examples, the fourth media device 126 can be an Apple® iPad®, a Samsung Tab® tablet computer, and/or any other client device. In further examples, the fourth media device 126 is any device that receives a media input and outputs the media. The fourth media device 126 includes the fourth application 130d to present media (e.g., on-demand media such as podcasts) at the fourth media device 126. The fourth media device 126 is in close proximity to the fourth meter 132d that can monitor media presented at the fourth media device 126. In the example of FIG. 1, the fourth meter 132d is a physical meter (e.g., a wearable PPM). In additional or alternative examples, the fourth meter 132d can be implemented by a software-based meter implemented at the fourth media device 126.

For the sake of clarity, the structure and functionality of the example first meter 132a, the example second meter 132b, the example third meter 132c, and the fourth meter 132d will be discussed with respect to the fourth meter 132d. However, the structure and functionality of the example first meter 132a, the example second meter 132b, the example third meter 132c, and the fourth meter 132d is not limited thereto. For example, the second meter 132b is implemented by a PPM which is coupled to the second media device 120 as opposed to the fourth meter 132d which is in close proximity to the fourth media device 126.

In the illustrated example of FIG. 1, the fourth meter 132d is a wearable PPM (e.g., a smart watch) that monitors media presented at the fourth media device 126. As the fourth meter 132d is a wearable PPM, the fourth meter 132d is in close proximity to the fourth media device 126 to ensure accurate measurement of the media presented at the fourth media device 126. In the example of FIG. 1, the fourth meter 132d is communicatively coupled to the access point 116. In additional or alternative examples, the fourth meter 132d can include the capabilities to send information through the wireless communication system 108 (e.g., the cellular communication system) via a wireless communication link.

In the illustrated example of FIG. 1, the fourth meter 132d monitors the media presented at the fourth media device 126. For example, the media presented at the fourth media device 126 includes on-demand media such as podcasts. The fourth meter 132d can determine whether the panelist 124 is exposed to on-demand media at the fourth media device 126. In additional or alternative examples, the fourth meter 132d can determine whether the panelist 124 is exposed to any type of media at the fourth media device 126. In response to detecting that the panelists 124 is exposed to on-demand media at the fourth media device 126, the fourth meter 132d generates sample signatures of the on-demand media to generate a sample profile of the on-demand media.

Fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Examples meters disclosed herein generate one or more sample signatures from sampled media (e.g., audio signals). For example, the fourth meter 132d can divide an audio signal (e.g., a digitized audio signal) into time-frequency bins and/or audio signal frequency components. For example, the fourth meter 132d can perform a fast Fourier transform (FFT) on an audio signal to transform the audio signal into the frequency domain.

Additionally, the example fourth meter 132d can divide the transformed audio signal into two or more frequency bins (e.g., using a Hamming function, a Hann function, etc.). In this example, each audio signal frequency component is associated with a frequency bin of the two or more frequency bins. Additionally or alternatively, the fourth meter 132d can aggregate the audio signal into one or more periods of time (e.g., the duration of the audio, six second segments, 1 second segments, etc.). In other examples, the fourth meter 132d can use any suitable technique to transform the audio signal (e.g., discrete Fourier transforms, a sliding time window Fourier transform, a wavelet transform, a discrete Hadamard transform, a discrete Walsh Hadamard, a constant-Q transform, a discrete cosine transform, etc.). In some examples, the fourth meter 132d can include one or more band-pass filters (BPFs). In some examples, the processed audio signal can be represented by a spectrogram. Example methods and apparatus to fingerprint an audio signal via normalization are disclosed in Coover et al., U.S. Patent Application Publication No. 2020/0082835, which is hereby incorporated by reference in its entirety. Example methods and apparatus to fingerprint an audio signal via exponential normalization are disclosed in Coover et al., U.S. patent application Ser. No. 16/696,874, which is hereby incorporated by reference in its entirety. Additional detail corresponding to the processing of the fourth meter 132d to generate signatures is discussed below in conjunction with FIG. 3.

Unlike media monitoring techniques based on fingerprints and/or signatures, audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

In the illustrated example of FIG. 1, after generating sample signatures of the on-demand media to generate a sample profile of the on-demand media, the fourth meter 132d stores the sample signatures at the fourth meter 132d. The fourth meter 132d additionally determines whether there is additional on-demand media for which to generate sample signatures. In response to determining that there is additional on-demand media for which to generate sample signatures, the fourth meter 132d generates samples signatures. In response to determining that there is not additional on-demand media for which to generate sample signatures, the fourth meter 132d determines whether a backhaul trigger event (e.g., a trigger to report meter data to the central facility 102) has occurred.

In the illustrated example of FIG. 1, in response to determining that a backhaul trigger event has occurred, the fourth meter 132d transmits the sample signatures to the central facility 102. For example, a backhaul trigger event can include detection of a connection to the Internet, expiration of a timer maintained by the meter, a reporting request message from the central facility 102, among others. In response to determining that a backhaul trigger event has not occurred, the fourth meter 132d determines whether to continue operating. For example, a condition that can cause the fourth meter 132d to determine to halt operation can be a loss of power. In response to determining to continue operating, the fourth meter 132d determines whether the panelist 124 is consuming on-demand media at the fourth media device 126.

Figure 2:
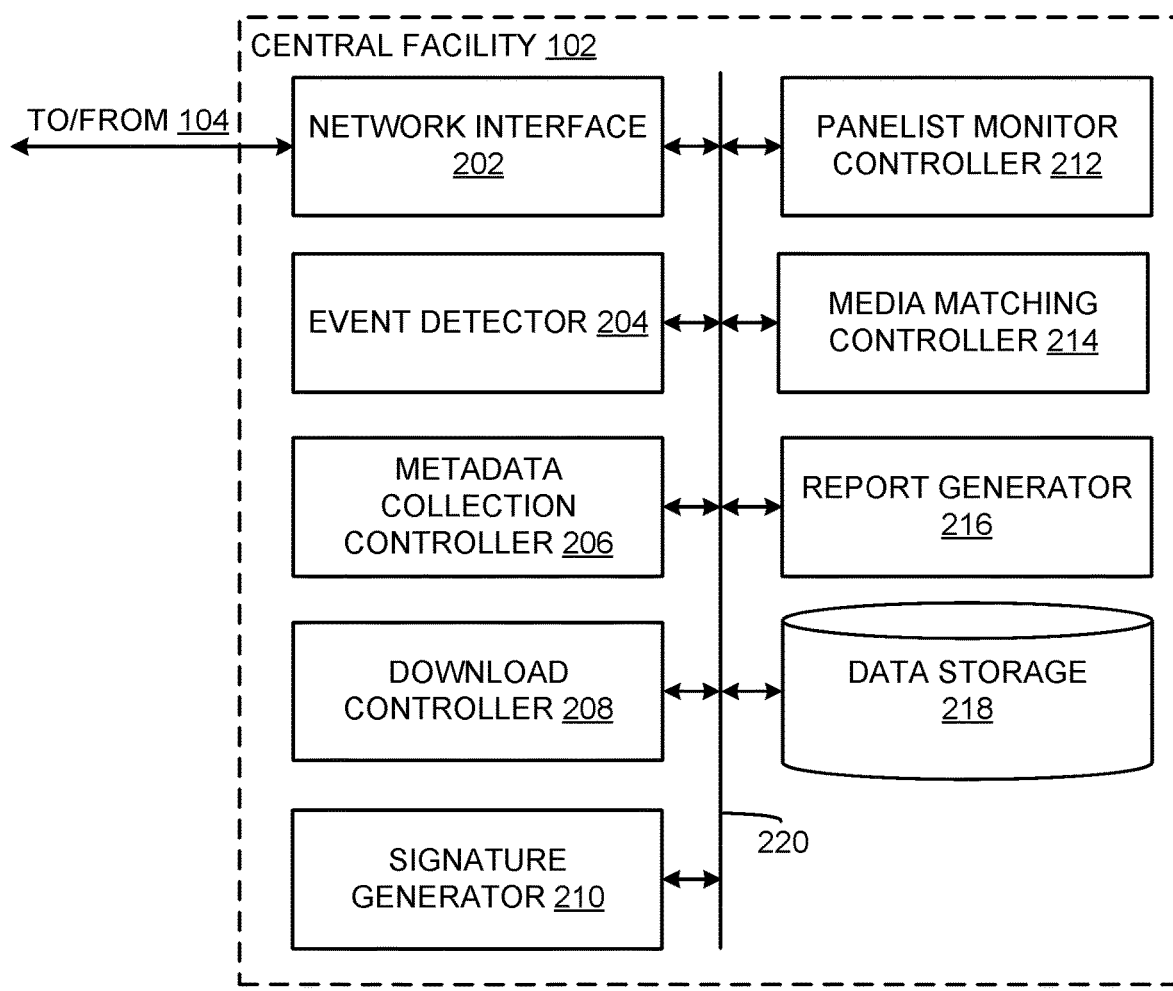
FIG. 2 is a block diagram of an example implementation of the central facility of FIG. 1.

FIG. 2 is a block diagram showing further detail of the example central facility 102 of FIG. 1. The example central facility 102 includes an example network interface 202, an example event detector 204, an example metadata collection controller 206, an example download controller 208, an example signature generator 210, an example panelist monitor controller 212, an example media matching controller 214, an example report generator 216, and an example data storage 218. In the example of FIG. 2, any of the network interface 202, the event detector 204, the metadata collection controller 206, the download controller 208, the signature generator 210, the panelist monitor controller 212, the media matching controller 214, the report generator 216, and/or the data storage 218 can communicate via an example communication bus 220. In examples disclosed herein, the communication bus 220 may be implemented using any suitable wired and/or wireless communication. In additional or alternative examples, the communication bus 220 includes software, machine readable instructions, and/or communication protocols by which information is communicated among the network interface 202, the event detector 204, the metadata collection controller 206, the download controller 208, the signature generator 210, the panelist monitor controller 212, the media matching controller 214, the report generator 216, and/or the data storage 218.

In the illustrated example of FIG. 2, the network interface 202 is a device that connects a first device (e.g., the central facility 102) to a network (e.g., the network 104). The network interface 202 may be implemented as hardware and/or software. As a hardware implementation, the network interface 202 may be electronic circuits that facilitate the communication between a network (e.g., network 104) and the parts of a computer responsible for processing the obtained network data (e.g., data from the network 104).

In the illustrated example of FIG. 2, the event detector 204 is a device that monitors the network 104 for various events. The event detector 204 may be implemented as hardware and/or software. As a hardware implementation, the event detector 204 may be electronic circuits that facilitate the monitoring for and/or detection of events. The event detector 204 is configured to monitor the network 104 via the network interface 202. For example, the event detector 204 monitors, via the network interface 202, RSS feeds generated by the on-demand media platform 112 to determine whether on-demand media has been published by the content creator 110. For example, to monitor RSS feeds, the event detector 204 can subscribe to one or more RSS feeds.

In the illustrated example of FIG. 2, the event detector 204 monitors, via the network interface 202, RSS feeds at the on-demand media platform 112 to determine whether end-users (e.g., the panelist 124) have downloaded on-demand media. For example, the event detector 204 can augment one or more URLs associated with RSS feeds with a prefix URL to redirect download requests to the event detector 204. For example, the event detector 204 can implement a mechanism (e.g., via a secure user account, a request/reply protocol, etc.) to provide clients (e.g., content creators) with the prefix URL and/or instructions for how to prefix the URL associated with the client's RSS feed with the prefix URL. In this manner, when an end-user and/or an end-user device (e.g., a media device, and/or any other client device) requests to download the on-demand media, the end-user and/or end-user device is temporarily redirected to the event detector 204 which detects the RSS redirect. After being redirected to the event detector 204, the end-user and/or end-user device is directed to the URL associated with the RSS feed and downloads the on-demand media. In some examples, the event detector 204 queries the on-demand media monitor 114 to monitor for on-demand media download requests and/or to determine whether end-users have downloaded on-demand media. For example, the event detector 204 can query the on-demand media monitor 114 to obtain a download count for on-demand media.

In additional or alternative examples, the event detector 204 accesses the network 104 to monitor meters (e.g., the first meter 132a, the second meter 132b, the third meter 132c, the fourth meter 132d, etc.). The example event detector 204 additionally or alternatively determines whether any of the meters have transmitted sample signatures to the central facility 102. For example, the sample signatures can be those signatures generated at the meters by sampling media presented at the meters.

In some examples, the example event detector 204 implements example means for detecting an event. The event detecting means is implemented by executable instructions such as that implemented by at least blocks 402 and 404 of FIG. 4; at least blocks 502 and 504 of FIG. 5; and/or at least blocks 604 and 606 of FIG. 6. The executable instructions of blocks 402 and 404 of FIG. 4; blocks 502 and 504 of FIG. 5; and/or blocks 604 and 606 of FIG. 6 may be executed on at least one processor such as the example processor 812 of FIG. 8. In other examples, the event detecting means is implemented by hardware logic, hardware implemented state machines, logic circuitry, and/or any other combination of hardware, software, and/or firmware.

In the illustrated example of FIG. 2, the metadata collection controller 206 is a device that controls the collection of metadata associated with on-demand media. The metadata collection controller 206 may be implemented as hardware and/or software. As a hardware implementation, the metadata collection controller 206 may be electronic circuits that facilitate the collection of metadata from RSS feeds hosted by the on-demand media platform 112.

In the illustrated example of FIG. 2, the metadata collection controller 206 collects metadata associated with on-demand media in response to the event detector 204 detecting that the content creator 110 and/or other content creators have published the on-demand media at the on-demand media platform 112. For example, in response to the event detector 204 determining and/or otherwise detecting that on-demand media has been published (e.g., via a notification received at the RSS feed of the on-demand media), the metadata collection controller 206 can access the on-demand media metadata hosted at the RSS feed to parse and/or otherwise extract metadata associated with the on-demand media. For example, metadata associated with on-demand media can include content creator (e.g., publisher), program (e.g., show, series, etc.) title, program genre, episode number, episode title, episode subject, artwork, on-demand media duration, on-demand media platform, location of the content creator, time of publication, date of publication, sponsors of the on-demand media (e.g., advertisers, advertisements, etc.), guest information (e.g., guest on a podcast), among others. The metadata collection controller 206 additionally or alternatively determines whether to continue profiling on-demand media.

In some examples, the metadata collection controller 206 collects a watermark payload. For example, some content creators may include watermarks in the metadata associated with their on-demand media. For example, a content creator that typically deals with syndicated media (e.g., NBC studios, ABC studios, CBS studios, etc.) may include watermarks in their on-demand media. In such an example, the metadata collection controller 206 extracts and/or is directed to (e.g., accesses) a location at which to download the watermark payload.

In some examples, the example metadata collection controller 206 implements example means for collecting metadata. The metadata collecting means is implemented by executable instructions such as that implemented by at least blocks 406 and 414 of FIG. 4. The executable instructions of blocks 406 and 414 of FIG. 4 may be executed on at least one processor such as the example processor 812 of FIG. 8. In other examples, the metadata collecting means is implemented by hardware logic, hardware implemented state machines, logic circuitry, and/or any other combination of hardware, software, and/or firmware.

In the illustrated example of FIG. 2, the download controller 208 is a device configured to download on-demand media and/or credit downloads of on-demand media by end-users. The download controller 208 may be implemented as hardware and/or software. As a hardware implementation, the download controller 208 may be electronic circuits that facilitate the download of on-demand media via RSS feeds hosted by the on-demand media platform 112.

In the illustrated example of FIG. 2, the download controller 208 downloads on-demand media via RSS feeds hosted by on-demand media platforms (e.g., the on-demand media platform 112). Additionally or alternatively, the download controller 208 can record download requests associated with on-demand media (e.g., 100,000 people downloaded the Joe Rogan Podcast). For example, in response to the event detector 204 determining that an end-user has requested a download of on-demand media (e.g., on-demand media has been published to the RSS feed), the download controller 208 can record a download request (e.g., credit a download request) associated with the on-demand media. The download controller 208 additionally records the internet protocol address and user agent string associated with the device requesting to download on-demand media. For example, when a user device is redirected to the event detector 204, the download controller 208 records the internet protocol address and user agent string associated with the user device. The download controller 208 additionally or alternatively determines whether to continue monitoring download requests of on-demand media.

In some examples, the example download controller 208 implements example means for controlling audience measurement entity downloads. The audience measurement entity download controlling means is implemented by executable instructions such as that implemented by at least block 408 of FIG. 4 and/or at least blocks 506 and 508 of FIG. 5. The executable instructions of block 408 of FIG. 4 and/or blocks 506 and 508 of FIG. 5 may be executed on at least one processor such as the example processor 812 of FIG. 8. In other examples, the audience measurement entity download controlling means is implemented by hardware logic, hardware implemented state machines, logic circuitry, and/or any other combination of hardware, software, and/or firmware.

In the illustrated example of FIG. 2, the signature generator 210 is a device that can generate one or more reference fingerprints and/or one or more reference signatures from media (e.g., audio signals). For example, the signature generator 210 can divide an audio signal (e.g., a digitized audio signal) into time-frequency bins and/or audio signal frequency components. For example, the signature generator 210 can perform a fast Fourier transform (FFT) on an audio signal to transform the audio signal into the frequency domain.

Additionally, the example signature generator 210 can divide the transformed audio signal into two or more frequency bins (e.g., using a Hamming function, a Hann function, etc.). In this example, each audio signal frequency component is associated with a frequency bin of the two or more frequency bins. Additionally or alternatively, the signature generator 210 can aggregate the audio signal into one or more periods of time (e.g., the duration of the audio, six second segments, 1 second segments, etc.). In other examples, the signature generator 210 can use any suitable technique to transform the audio signal (e.g., discrete Fourier transforms, a sliding time window Fourier transform, a wavelet transform, a discrete Hadamard transform, a discrete Walsh Hadamard, a constant-Q transform, a discrete cosine transform, etc.). In some examples, the signature generator 210 can include one or more band-pass filters (BPFs). In some examples, the processed audio signal can be represented by a spectrogram.

In the example of FIG. 2, the signature generator 210 can determine the audio characteristics of a portion of the audio signal (e.g., an audio signal frequency component, an audio region surrounding a time-frequency bin, etc.). For example, the signature generator 210 can determine the mean energy (e.g., average power, etc.) of one or more of the audio signal frequency component(s). Additionally or alternatively, the signature generator 210 can determine other characteristics of a portion of the audio signal (e.g., the mode energy, the median energy, the mode power, the median energy, the mean energy, the mean amplitude, etc.).

In the illustrated example of FIG. 2, the signature generator 210 can normalize one or more time-frequency bins by an associated audio characteristic of the surrounding audio region. For example, the signature generator 210 can normalize a time-frequency bin by a mean energy of the surrounding audio region. In other examples, the signature generator 210 normalizes some of the audio signal frequency components by an associated audio characteristic. For example, the signature generator 210 can normalize each time-frequency bin of an audio signal frequency component using the mean energy associated with that audio signal component. In some examples, the processed bins (e.g., a normalized time-frequency bin, a normalized audio signal frequency component, etc.) can be represented as a spectrogram.

In the illustrated example of FIG. 2, the signature generator 210 can select one or more points from the normalized audio signal to be used to generate a fingerprint and/or signature. For example, the signature generator 210 can select a plurality of energy maxima of the normalized audio signal. In other examples, the signature generator 210 can select any other suitable points of the normalized audio.

Additionally or alternatively, the signature generator 210 can weigh the selection of points based on a category of the audio signal. For example, the signature generator 210 can weigh the selection of points into common frequency ranges of music (e.g., bass, treble, etc.) if the category of the audio signal is music. In some examples, the signature generator 210 can determine the category of an audio signal (e.g., music, speech, sound effects, advertisements, etc.). The example signature generator 210 generates a fingerprint and/or a signature using the selected points. The example signature generator 210 can generate a fingerprint from the selected points using any suitable method. Example methods and apparatus to fingerprint an audio signal via normalization are disclosed in Coover et al., US Patent Application Publication Number 2020/0082835. Example methods and apparatus to fingerprint an audio signal via exponential normalization are disclosed in Coover et al., U.S. patent application Ser. No. 16/696,874. After generating one or more reference signatures (e.g., n reference signatures) of on-demand media hosted at an on-demand media platform (e.g., the on-demand media platform 112), the signature generator 210 stores the one or more reference signatures at the data storage 218.

In some examples, the example signature generator 210 implements example means for signature generating. The signature generating means is implemented by executable instructions such as that implemented by at least blocks 410 and 412 of FIG. 4. The executable instructions of blocks 410 and 412 of FIG. 4 may be executed on at least one processor such as the example processor 812 of FIG. 8. In other examples, the signature generating means is implemented by hardware logic, hardware implemented state machines, logic circuitry, and/or any other combination of hardware, software, and/or firmware.

In the illustrated example of FIG. 2, the panelists monitor controller 212 is a device that controls the collection of data from panelists (e.g., the panelist 124). The panelist monitor controller 212 may be implemented as hardware and/or software. As a hardware implementation, the panelist monitor controller 212 may be electronic circuits that facilitate the collection of data from panelists.

In the illustrated example of FIG. 2, the panelist monitor controller 212 collects panelist information. For example, the panelist monitor controller 212 collects panelist information from meters (e.g., wearable PPMs, nano PPMs, etc.). Panelist information can include information identifying a model of a device associated with the panelist, a mailing address associated with the panelist, an email address associated with the panelist, a phone number associated with the panelist, a unique identifier of the panelist and/or device (e.g., a social security number of the panelist, a phone number of a mobile device associated with the panelist, a zip code of the panelist, and/or any combination or derivation of any information related to the panelist and/or device), the age of the panelist, the gender of the panelist, the race of the panelist, the marital status of the panelist, the income of the panelist and/or the household of the panelist, the employment status of the panelist, where the panelist typically intend to use their device, how long the panelist has owned their device, the education level of the panelist and/or any other information related to the panelist and/or the device associated with the panelist.

In some examples, the example panelist monitor controller 212 implements example means for monitoring panelists. The panelist monitoring means is implemented by executable instructions such as that implemented by at least block 602 of FIG. 6. The executable instructions of block 602 of FIG. 6 may be executed on at least one processor such as the example processor 812 of FIG. 8. In other examples, the panelist monitoring means is implemented by hardware logic, hardware implemented state machines, logic circuitry, and/or any other combination of hardware, software, and/or firmware.

In the illustrated example of FIG. 2, the media matching controller 214 is a device that matches media collected from panelists (e.g., the panelist 124) with media stored in the data storage 218. The media matching controller 214 may be implemented as hardware and/or software. As a hardware implementation, the media matching controller 214 may be electronic circuits that facilitate the matching of sample media to reference media, for example, via one or more signatures.

In the illustrated example of FIG. 2, the media matching controller 214 compares one or more sample signatures (e.g., those generated by meters, the central facility 102, etc.) and compares the one or more sample signatures to one or more reference signatures stored at the data storage 218. The media matching controller 214 determines whether a first sample signature matches any of the reference signatures stored at the data storage 218. If the media matching controller 214 determines that the first sample signature does not match any of the reference signatures, the event detector 204 continues to monitor one or more meter(s) for sample signatures.

In the illustrated example of FIG. 2, if the media matching controller 214 determines that the first sample signature does match any of the reference signatures, the media matching controller 214 determines whether the central facility 102 has received additional sample signatures. If the central facility 102 has not received additional sample signatures, the media matching controller 214 identifies the on-demand media associated with the sample signature based on the matching reference signature. If the central facility 102 has received additional sample signatures, the media matching controller 214 compares the next sample signature to the reference signatures stored at the data storage 218.

In the illustrated example of FIG. 2, the media matching controller 214 determines whether the previous sample signature and the current sample signature are consecutive. For example, consecutive sample signatures can correspond to sequential timestamps of the sampled media. If the media matching controller 214 determines that the previous sample signature and the current sample signature are consecutive, the media matching controller 214 filters profiles at the data storage that do not include consecutive reference signatures. If the media matching controller 214 determines that the previous sample signature and the current sample signature are not consecutive, the media matching controller 214 filters profiles at the data storage that include consecutive reference signatures.

In the illustrated example of FIG. 2, after filtering profiles, the media matching controller 214 identifies the on-demand media associated with the sample signature(s) based on the remaining reference signature(s). Additionally or alternatively, the media matching controller 214 can determine whether to continue matching media received from meters.

In some examples, the media matching controller 214 can forego signature-based matching. For example, if the metadata collection controller 206 extracts a watermark payload when collecting metadata, the media matching controller 214 can identify on-demand media to by accessing a table of reference watermarks (e.g., reference watermarks extracted from watermark payloads and stored in the local storage by the metadata collection controller 206) that are mapped to media identifying information.

In some examples, the example media matching controller 214 implements example means for matching media. The media matching means is implemented by executable instructions such as that implemented by at least blocks 608, 610, 612, 614, 616, 618, 620, and 622 of FIG. 6. The executable instructions of blocks 608, 610, 612, 614, 616, 618, 620, and 622 of FIG. 6 may be executed on at least one processor such as the example processor 812 of FIG. 8. In other examples, the media matching means is implemented by hardware logic, hardware implemented state machines, logic circuitry, and/or any other combination of hardware, software, and/or firmware.

In the illustrated example of FIG. 2, the report generator 216 is a device that generates reports based on monitored media. The report generator 216 may be implemented as hardware and/or software. As a hardware implementation, the report generator 216 may be electronic circuits that facilitate the generation of reports associated with on-demand media.

In the illustrated example of FIG. 2, the report generator 216 generates and/or prepares reports associated with on-demand media. For example, after the media matching controller 214 identifies the media associated with one or more sample signatures, the report generator 216 records a listen corresponding to the on-demand media associated with the matching profile. Additionally or alternatively, the report generator 216 identifies the panelist and/or panelists associated with the sample signature and/or sample signatures that matched the profile.

In the illustrated example of FIG. 2, based on the panelist(s) identified and the comparison to the reference library stored at the data storage 218, the report generator 216 determines metrics associated with the on-demand media. The report generator 216 additionally or alternatively generates a report and/or reports including the metrics associated with the on-demand media. For example, the report generator 216 prepares reports including information associated with the ratings of on-demand media. For example, the report generator 216 can identify the top listened to podcasts during a given time period (e.g., a Top 10 list for the month of January). Example metrics associated with the on-demand media disclosed herein can include how many people were exposed to (e.g., listened to) the on-demand media, the demographic makeup of the audience, how much of the on-demand media was presented to the audience members (e.g., length of time the audience members played the on-demand media back, 40% of audience members were exposed to the first 20 minutes of the on-demand media, etc.), the types of devices at which the on-demand media was consumed, among others.

In additional or alternative examples, the report generator 216 transmits one or more reports to a client (e.g., content creators, on-demand media providers, podcasters, etc.). In some examples, the report generator 216 transmits reports in response to a request from a client. In some examples, the report generator 216 stores one or more reports in the data storage 218.

In some examples, the example report generator 216 implements example means for generating reports. The report generating means is implemented by executable instructions such as that implemented by at least blocks 624, 626, 628, and 630 of FIG. 6. The executable instructions of blocks 624, 626, 628, and 630 of FIG. 6 may be executed on at least one processor such as the example processor 812 of FIG. 8. In other examples, the report generating means is implemented by hardware logic, hardware implemented state machines, logic circuitry, and/or any other combination of hardware, software, and/or firmware.

In the illustrated example of FIG. 2, the data storage 218 is configured to record data (e.g., obtained information, generated messages, etc.). For example, the data storage 218 can store one or more files indicative of on-demand media reports, on-demand media profiles, panelist information, among others. For example, on-demand media profiles include a digital summary of the on-demand media (e.g., reference signature(s)) and metadata associated with the on-demand media. For example, metadata associated with on-demand media includes content creator (e.g., publisher), program title, program genre, episode number, episode title, episode subject, artwork, on-demand media duration, on-demand media platform, location of the content creator, time of publication, date of publication, sponsors of the on-demand media (e.g., advertisers, advertisements, etc.), guest information (e.g., guest on a podcast), among others.

Additionally, the data storage 218 can store one or more IP addresses and/or one or more user agent strings associated with one or more devices requesting to download on-demand media. The data storage 218 can additionally store panelist information. For example panelist information can include information identifying a model of a device associated with the panelist, a mailing address associated with the panelist, an email address associated with the panelist, a phone number associated with the panelist, a unique identifier of the panelist and/or device (e.g., a social security number of the panelist, a phone number of a mobile device associated with the panelist, a zip code of the panelist, and/or any combination or derivation of any information related to the panelist and/or device), the age of the panelist, the gender of the panelist, the race of the panelist, the marital status of the panelist, the income of the panelist and/or the household of the panelist, the employment status of the panelist, where the panelist typically intend to use their device, how long the panelist has owned their device, the education level of the panelist and/or any other information related to the panelist and/or the device associated with the panelist.

In the example of FIG. 2, the data storage 218 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The data storage 218 may additionally or alternatively be implemented by one or more double data rate (DDR) memories, such as DDR, DDR2, DDR3, DDR4, mobile DDR (mDDR), etc. The data storage 218 may additionally or alternatively be implemented by one or more mass storage devices such as hard disk drive(s), compact disk drive(s), digital versatile disk drive(s), solid-state disk drive(s), etc. While in the illustrated example the data storage 218 is illustrated as a single database, the data storage 218 may be implemented by any number and/or type(s) of databases. Furthermore, the data stored in the data storage 218 may be in any data format such as, for example, binary data, comma delimited data, tab delimited data, structured query language (SQL) structures, etc.

Figure 3:
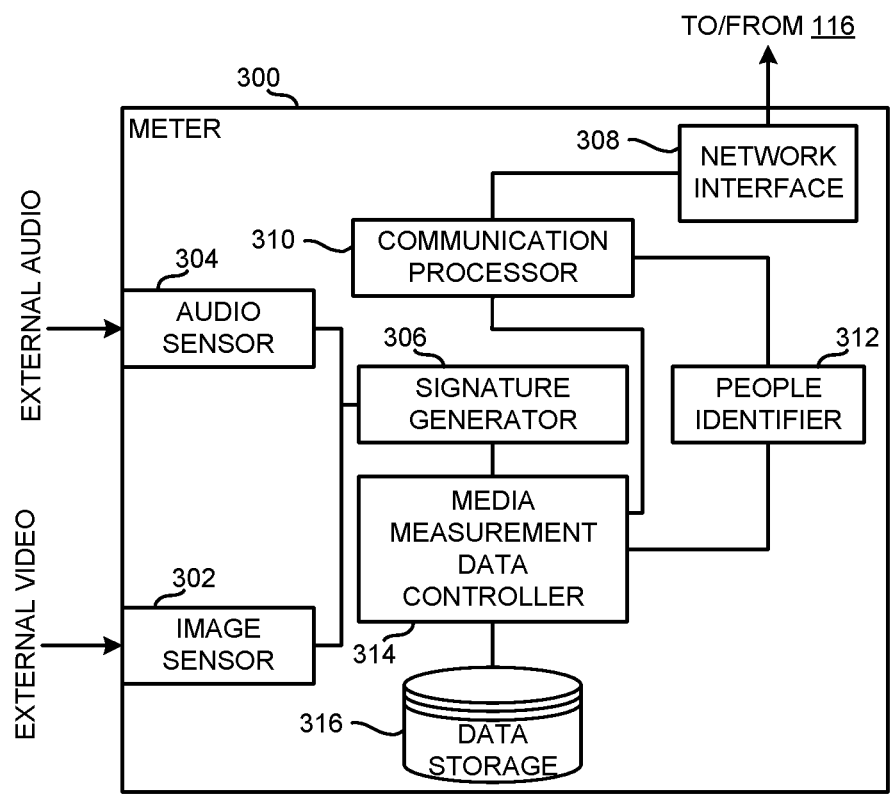
FIG. 3 is a block diagram of an example implementation of one or more of the meters of FIG. 1.

FIG. 3 is a block diagram of an example meter 300 that corresponds to an example implementation of one or more of the example first meter 132a, the example second meter 132b, the example third meter 132c, and the example fourth meter 132d of FIG. 1. The example meter 300 of FIG. 3 includes an example image sensor 302, an example audio sensor 304, an example signature generator 306, an example network interface 308, an example communication processor 310, an example people identifier 312, an example media measurement data controller 314, and an example data storage 316.

The example image sensor 302 of the illustrated example of FIG. 3 is a camera. The example image sensor 302 receives light waves, such as the light waves emitting from the example second media device 120, and converts them into signals that convey information. Additionally or alternatively, the example image sensor 302 may be implemented by a line input connection, where the video and images presented by the example second media device 120 are carried over an audio-visual (AV) network (e.g., high definition multimedia interface (HDMI) cable) to the example meter 300. In some examples, the image sensor 302 may not be included in the example meter 300. For example, it may not be necessary for the meter 300 to utilize the image sensor 302 to identify media data. However, in some examples, the image sensor 302 can be utilized for detection of media data.

In the illustrated example of FIG. 3, one image sensor 302 is shown. However, any other number of image sensor(s) may additionally or alternatively be used. For example, two image sensors may be used, four image sensors may be used, etc. Media received by the example image sensor 302 is passed to the signature generator 306 for identification.

In some examples, the image sensor 302 implements example means for sensing images. The image sensing means is implemented by executable instructions such as that implemented by at least block 704 of FIG. 7. The executable instructions of block 704 of FIG. 7 may be executed on at least one processor such as the example processor 912 of FIG. 9. In other examples, the image sensing means is implemented by hardware logic, hardware implemented state machines, logic circuitry, and/or any other combination of hardware, software, and/or firmware.

The example audio sensor 304 of the illustrated example of FIG. 3 is a microphone. The example audio sensor 304 receives ambient sound (e.g., free field audio) including audible media presented in the vicinity of the meter 300. Additionally or alternatively, the example audio sensor 304 may be implemented by a line input connection. The line input connection may allow an external microphone to be used with the meter 300 and/or, in some examples, may enable the audio sensor 304 to be directly connected to an output of a media presentation device (e.g., an auxiliary output of a television, an auxiliary output of an audio/video receiver of a home entertainment system, etc.) Advantageously, the meter 300 is positioned in a location such that the audio sensor 304 receives ambient audio produced by the television and/or other devices of the home entertainment system with sufficient quality to identify media presented by the second media device 120 and/or other devices of measurement location 106 (e.g., a surround sound speaker system). For example, in examples disclosed herein, the meter 300 may be placed on top of the television, secured to the bottom of the television, worn on a panelist (e.g., the panelist 124), etc.

In the illustrated example of FIG. 3, one audio sensor 304 is shown. However, any other number of audio sensor(s) may additionally or alternatively be used. For example, two audio sensors may be used, four audio sensors may be used, etc. Audio received by the example audio sensor 304 is passed to the signature generator 306 for identification.

In some examples, the example audio sensor 304 implements example means for sensing audio. The audio sensing means is implemented by executable instructions such as that implemented by at least block 706 of FIG. 7. The executable instructions of block 706 of FIG. 7 may be executed on at least one processor such as the example processor 912 of FIG. 9. In other examples, the audio sensing means is implemented by hardware logic, hardware implemented state machines, logic circuitry, and/or any other combination of hardware, software, and/or firmware.

The example signature generator 306 of the illustrated example of FIG. 3 analyzes signals received via the image sensor 302 and/or audio received via the audio sensor 304 and generates one or more signatures (e.g., sample signatures) of the media being presented. The example signature generator 306 of the illustrated example outputs the one or more signatures to the media measurement data controller 314. For example, the signature generator 306 generates one or more sample fingerprints and/or one or more sample signatures from sampled media (e.g., audio signals and/or video signals). For example, the signature generator 306 can divide an audio signal (e.g., a digitized audio signal) into time-frequency bins and/or audio signal frequency components. For example, the signature generator 306 can perform a fast Fourier transform (FFT) on an audio signal to transform the audio signal into the frequency domain.

Additionally, the example signature generator 306 can divide the transformed audio signal into two or more frequency bins (e.g., using a Hamming function, a Hann function, etc.). In this example, each audio signal frequency component is associated with a frequency bin of the two or more frequency bins. Additionally or alternatively, the signature generator 306 can aggregate the audio signal into one or more periods of time (e.g., the duration of the audio, six second segments, 1 second segments, etc.). In other examples, the signature generator 306 can use any suitable technique to transform the audio signal (e.g., discrete Fourier transforms, a sliding time window Fourier transform, a wavelet transform, a discrete Hadamard transform, a discrete Walsh Hadamard, a constant-Q transform, a discrete cosine transform, etc.). In some examples, the signature generator 306 can include one or more band-pass filters (BPFs). In some examples, the processed audio signal can be represented by a spectrogram.

In the example of FIG. 3, the signature generator 306 can determine the audio characteristics of a portion of the audio signal (e.g., an audio signal frequency component, an audio region surrounding a time-frequency bin, etc.). For example, the signature generator 306 can determine the mean energy (e.g., average power, etc.) of one or more of the audio signal frequency component(s). Additionally or alternatively, the signature generator 306 can determine other characteristics of a portion of the audio signal (e.g., the mode energy, the median energy, the mode power, the median energy, the mean energy, the mean amplitude, etc.).

In the illustrated example of FIG. 3, the signature generator 306 can normalize one or more time-frequency bins by an associated audio characteristic of the surrounding audio region. For example, the signature generator 306 can normalize a time-frequency bin by a mean energy of the surrounding audio region. In other examples, the signature generator 306 normalizes some of the audio signal frequency components by an associated audio characteristic. For example, the signature generator 306 can normalize each time-frequency bin of an audio signal frequency component using the mean energy associated with that audio signal component. In some examples, the processed bins (e.g., a normalized time-frequency bin, a normalized audio signal frequency component, etc.) can be represented as a spectrogram.

In the illustrated example of FIG. 3, the signature generator 306 can select one or more points from the normalized audio signal to be used to generate a fingerprint and/or signature. For example, the signature generator 306 can select a plurality of energy maxima of the normalized audio signal. In other examples, the signature generator 306 can select any other suitable points of the normalized audio.

Additionally or alternatively, the signature generator 306 can weigh the selection of points based on a category of the audio signal. For example, the signature generator 306 can weigh the selection of points into common frequency ranges of music (e.g., bass, treble, etc.) if the category of the audio signal is music. In some examples, the signature generator 306 can determine the category of an audio signal (e.g., music, speech, sound effects, advertisements, etc.). The example signature generator 306 generates a fingerprint and/or a signature using the selected points. The example signature generator 306 can generate a fingerprint from the selected points using any suitable method. Example methods and apparatus to fingerprint an audio signal via normalization are disclosed in Coover et al., US Patent Application Publication Number 2020/0082835. Example methods and apparatus to fingerprint an audio signal via exponential normalization are disclosed in Coover et al., U.S. patent application Ser. No. 16/696,874. After generating one or more sample signatures (e.g., n sample signatures) of on-demand media hosted at an on-demand media platform (e.g., the on-demand media platform 112), the signature generator 306 stores the one or more sample signatures at the data storage 316.

In some examples, the example signature generator 306 implements example means for signature generating. The signature generating means is implemented by executable instructions such as that implemented by at least blocks 708 and 712 of FIG. 7. The executable instructions of blocks 708 and 712 of FIG. 7 may be executed on at least one processor such as the example processor 912 of FIG. 9. In other examples, the signature generating means is implemented by hardware logic, hardware implemented state machines, logic circuitry, and/or any other combination of hardware, software, and/or firmware.

The example network interface 308 of the illustrated example of FIG. 3 is a communication interface configured to receive and/or otherwise transmit corresponding communications to and/or from the access point 116. In the illustrated example, the network interface 308 facilitates wired and/or wireless communication via an Ethernet network hosted by the example access point 116 of FIG. 1. In some examples, the network interface 308 is implemented by a Wi-Fi radio that communicates via the LAN hosted by the example access point 116. In other examples disclosed herein, any other type of wireless transceiver may additionally or alternatively be used to implement the network interface 308. In examples disclosed herein, the example network interface 308 communicates information to the communication processor 310 which performs actions based on the received information. In other examples disclosed herein, the network interface 308 may transmit media measurement information provided by the media measurement data controller 314 (e.g., data stored in the data storage 316) to the central facility 102 of the media measurement entity.

The example communication processor 310 of the illustrated example of FIG. 3 receives information from the network interface 308 and performs actions based on that received information. For example, the communication processor 310 packages records corresponding to collected metering data and transmits records to the central facility 102. In examples disclosed herein, the communication processor 310 communicates with the signature generator 306 and/or a media measurement data controller 314 to provide information to the network interface 308 in response to a request for metering data. In other examples disclosed herein, the communication processor 310 may process and/or otherwise package information from the network interface 308 for use by the media measurement data controller 314.

The example people identifier 312 of the illustrated example of FIG. 3 determines audience identification data representative of the identities of the audience member(s) (e.g., panelists) present in the measurement location 106. In some examples, the people identifier 312 collects audience identification data by periodically or a-periodically prompting audience members in the measurement location 106 to identify themselves as present in the audience. Panelists may identify themselves by, for example, pressing a button on a remote, speaking their name, etc. In some examples, the people identifier 312 prompts the audience member(s) to self-identify in response to one or more predetermined events (e.g., when the second media device 120 is turned on, a channel is changed, an infrared control signal is detected, etc.). The people identifier 312 provides the audience identification data to the media measurement data controller 314 such that the media measurement data can be correlated with the media identification data to facilitate an identification of which media was presented to which audience member.

In some examples, the example people identifier 312 implements example means for identifying people. The people identifying means is implemented by executable instructions such as that implemented by at least block 702 of FIG. 7. The executable instructions of block 702 of FIG. 7 may be executed on at least one processor such as the example processor 912 of FIG. 9. In other examples, the people identifying means is implemented by hardware logic, hardware implemented state machines, logic circuitry, and/or any other combination of hardware, software, and/or firmware.

The example media measurement data controller 314 of the illustrated example of FIG. 3 receives media identifying information (e.g., information that can be used to identify media, a signature, etc.) from the signature generator 306 and audience identification data from the people identifier 312 and stores the received information in the data storage 316. The example media measurement data controller 314 periodically and/or a-periodically transmits, via the network interface 308, the media measurement information stored in the data storage 316 to the central facility 102 for post-processing of media measurement data, aggregation and/or preparation of media monitoring reports. In some examples, the media measurement data controller 314 performs forward pass and backward pass operations on the media data stored in the example data storage 316. For example, the media measurement data controller 314 may determine the signature generator 306 was unable to classify the media data according to the television broadcasts, radio broadcasts, advertisements (television and/or radio), downloaded media, streaming media, prepackaged media, etc., and queries the data storage 316 for operating state characteristics of the active device at the time the signature generator 306 was unable to identify the media data. Further, if the example media measurement data controller 314 determines the active device was on and presenting video or audio, the media measurement data controller 314 will perform forward pass on the data stored in the example data storage 316 and further perform backward pass if the forward pass operation did not identify all-other-tuning (AOT) data.

In some examples, the example media measurement data controller 314 implements example means for controlling media measurement data. The media measurement data controlling means is implemented by executable instructions such as that implemented by at least blocks 710, 714, 716, and 718 of FIG. 7. The executable instructions of blocks 710, 714, 716, and 718 of FIG. 7 may be executed on at least one processor such as the example processor 912 of FIG. 9. In other examples, the media measurement controlling means is implemented by hardware logic, hardware implemented state machines, logic circuitry, and/or any other combination of hardware, software, and/or firmware.

In the illustrated example of FIG. 3, the data storage 316 is configured to record data (e.g., obtained information, generated messages, etc.). For example, the data storage 316 can store one or more files indicative of media identifying information collected by the signature generator 306 and audience identification data collected by the people identifier 312

In the example of FIG. 3, the data storage 316 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The data storage 316 may additionally or alternatively be implemented by one or more double data rate (DDR) memories, such as DDR, DDR2, DDR3, DDR4, mobile DDR (mDDR), etc. The data storage 316 may additionally or alternatively be implemented by one or more mass storage devices such as hard disk drive(s), compact disk drive(s), digital versatile disk drive(s), solid-state disk drive(s), etc. While in the illustrated example the data storage 316 is illustrated as a single database, the data storage 316 may be implemented by any number and/or type(s) of databases. Furthermore, the data stored in the data storage 316 may be in any data format such as, for example, binary data, comma delimited data, tab delimited data, structured query language (SQL) structures, etc.

While an example manner of implementing the central facility 102 of FIG. 1 is illustrated in FIG. 2 and an example manner of implementing one or more of the first meter 132a, the second meter 132b, the third media 132c, and/or the fourth meter 132d of FIG. 1 is illustrated in FIG. 3, one or more of the elements, processes and/or devices illustrated in FIG. 2 and/or FIG. 3 may be combined, divided, re-arranged, omitted, eliminated and/or implemented in any other way. Further, the example network interface 202, the example event detector 204, the example metadata collection controller 206, the example download controller 208, the example signature generator 210, the example panelist monitor controller 212, the example media matching controller 214, the example report generator 216, the example data storage 216218 and/or, more generally, the example central facility 102 of FIG. 2, and/or, the example image sensor 302, the example audio sensor, the example signature generator 306, the example network interface 308, the example communication processor 310, the example people identifier 312, the example media measurement data controller 314, the example data storage 316, and/or, more generally, the meter 300 may be implemented by hardware, software, firmware and/or any combination of hardware, software and/or firmware. Thus, for example, any of the example network interface 202, the example event detector 204, the example metadata collection controller 206, the example download controller 208, the example signature generator 210, the example panelist monitor controller 212, the example media matching controller 214, the example report generator 216, the example data storage 218, and/or, more generally, the example central facility 102 of FIG. 2, and/or, the example image sensor 302, the example audio sensor, the example signature generator 306, the example network interface 308, the example communication processor 310, the example people identifier 312, the example media measurement data controller 314, the example data storage 316, and/or, more generally, the meter 300 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example event detector 204, the example metadata collection controller 206, the example download controller 208, the example signature generator 210, the example panelist monitor controller 212, the example media matching controller 214, the example report generator 216, the example data storage 218, and/or, more generally, the example central facility 102 of FIG. 2, and/or, the example image sensor 302, the example audio sensor, the example signature generator 306, the example network interface 308, the example communication processor 310, the example people identifier 312, the example media measurement data controller 314, the example data storage 316, and/or, more generally, the meter 300 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central facility 102 of FIG. 2 and/or the example meter 300 of FIG. 3 may include one or more elements, processes and/or devices in addition to, or instead of, those illustrated in FIG. 2 and/or FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
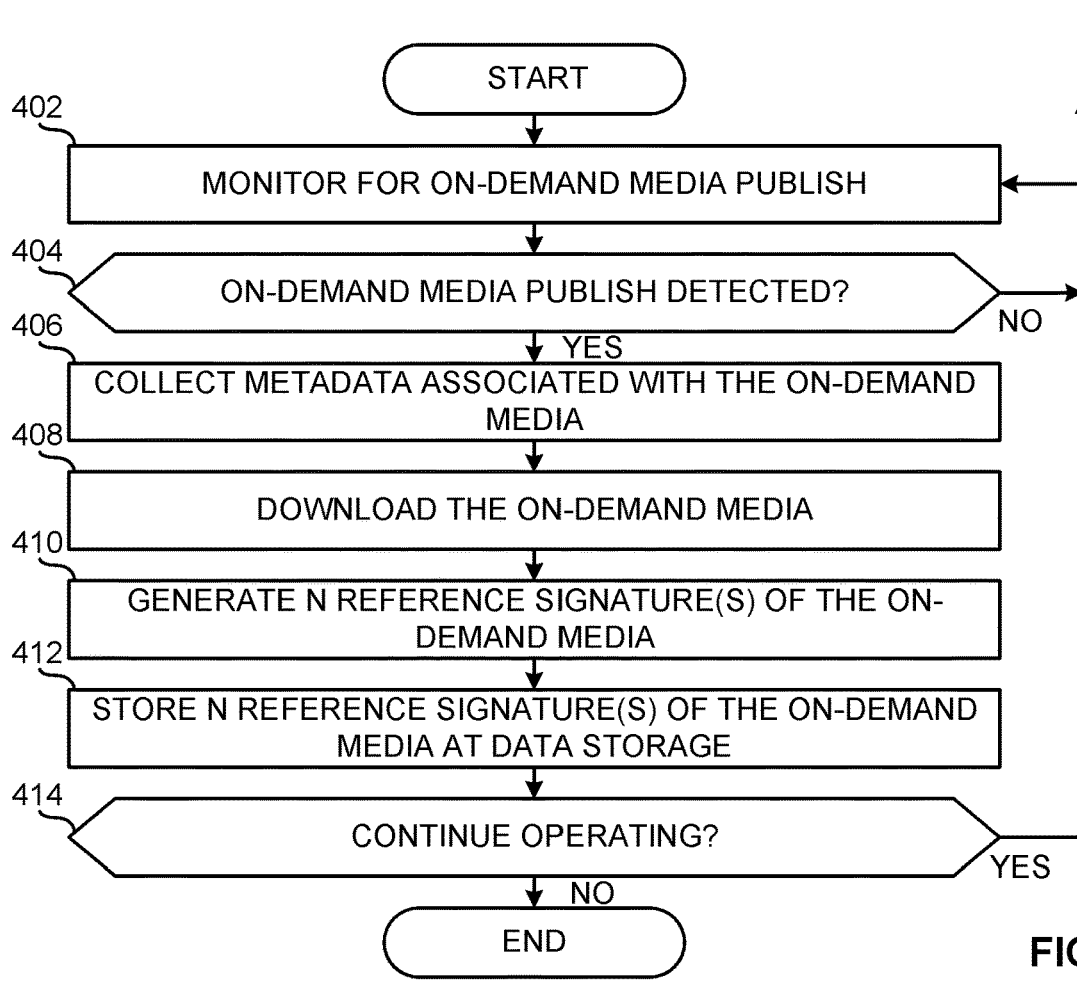
FIG. 4 is a flowchart representative of a process, which may be implemented utilizing machine-readable instructions that may be executed, to implement the example central facility of FIGS. 1 and 2 to generate reference data for on-demand media.
Figure 5:
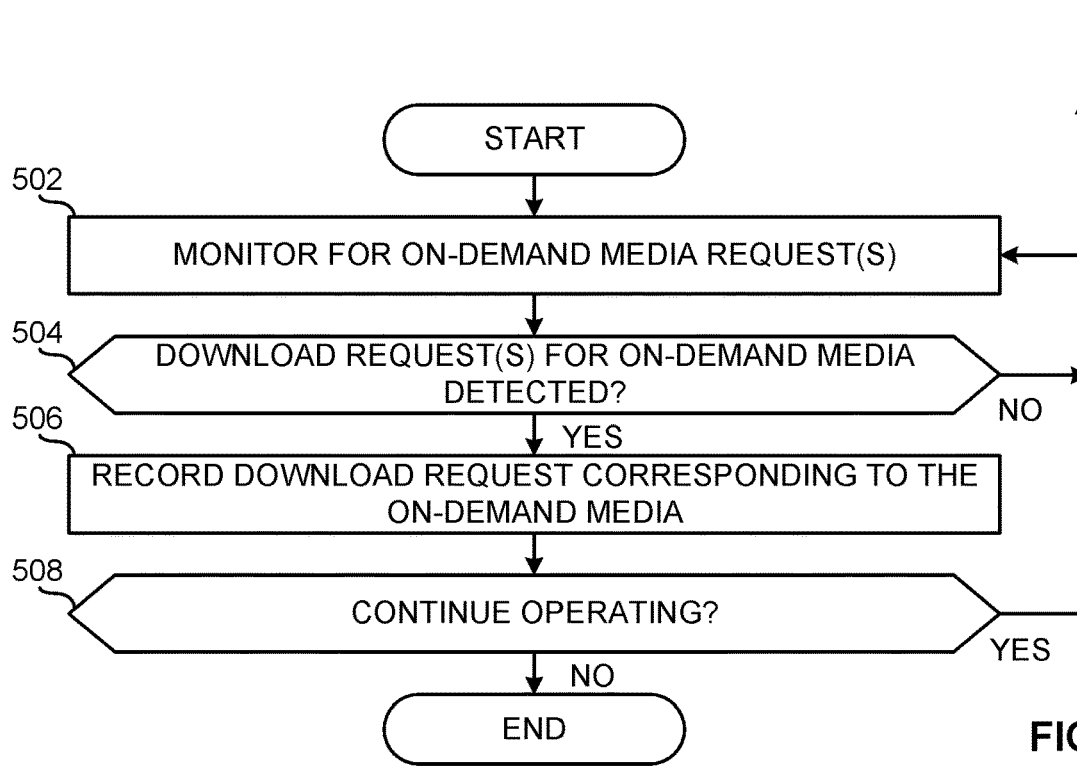
FIG. 5 is a flowchart representative of a process, which may be implemented utilizing machine-readable instructions that may be executed, to implement the example central facility of FIGS. 1 and 2 to record download requests for on-demand media.
Figure 6:
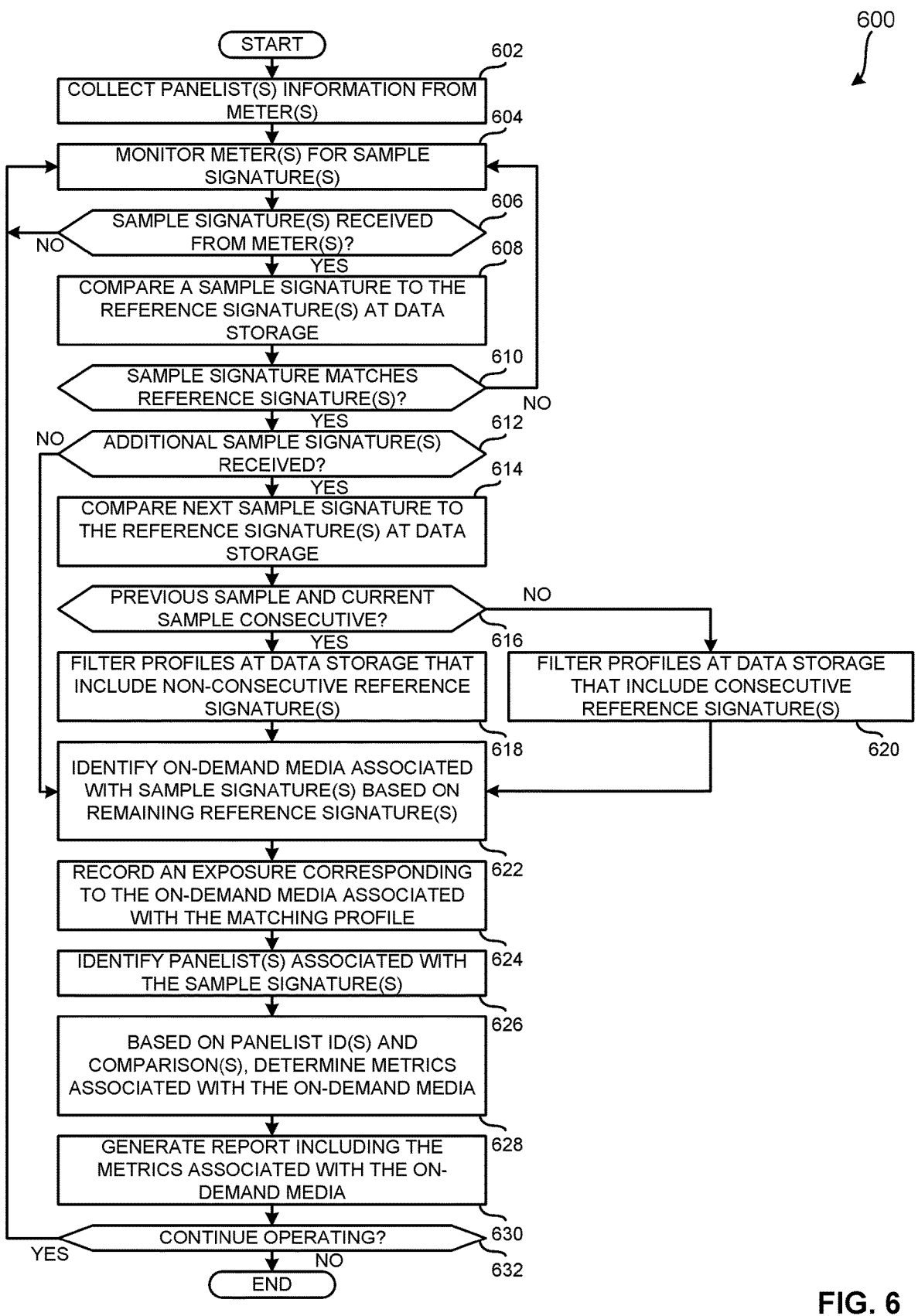
FIG. 6 is a flowchart representative of a process, which may be implemented utilizing machine-readable instructions that may be executed, to implement the example central facility of FIGS. 1 and 2 to identify on-demand media.

Flowcharts representative of example hardware logic, machine readable instructions, hardware implemented state machines, and/or any combination thereof for implementing the central facility 102 of FIG. 2 are shown in FIGS. 4, 5, and 6. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4, 5, and 6, many other methods of implementing the example central facility 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.)

Figure 7:
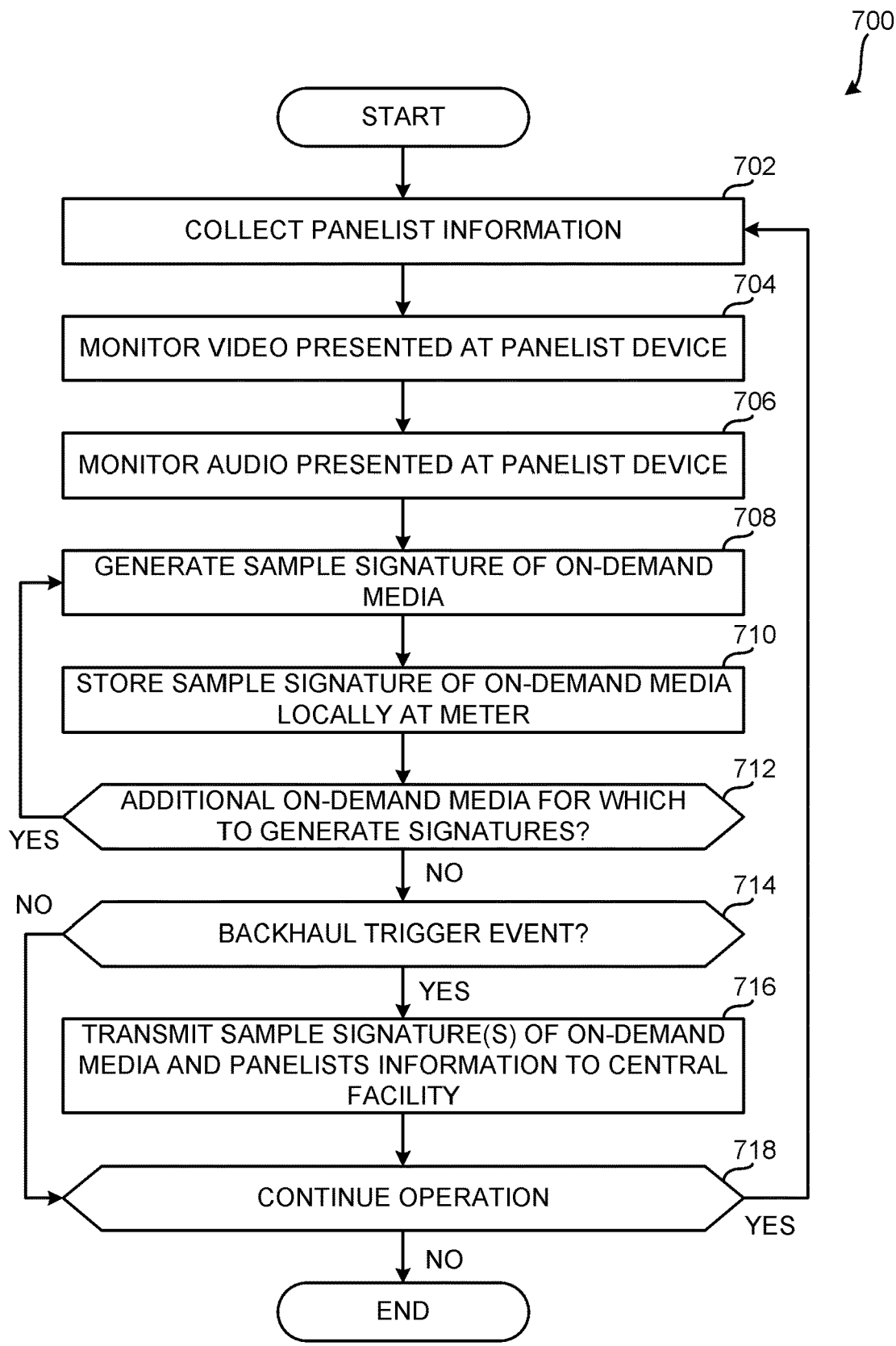
FIG. 7 is a flowchart representative of a process, which may be implemented utilizing machine-readable instructions that may be executed, to implement the example one or more meters of FIGS. 1 and 3 to monitor on-demand media at a device.

A flowchart representative of example hardware logic, machine readable instructions, hardware implemented state machines, and/or any combination thereof for implementing the meter 300 of FIG. 3 is shown in FIG. 7. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIG. 7, many other methods of implementing the example meter 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.)

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5, 6, and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of a process 400, which may be implemented utilizing machine-readable instructions that may be executed, to implement the example central facility 102 of FIGS. 1 and/or 2 to generate reference data (e.g., reference signatures and associated identification information) for on-demand media. The process 400 begins at block 402 where the event detector 204 monitors the network 104 for publications of on-demand media. For example, the event detector 204 can monitor one or more RSS feeds hosted by one or more on-demand media platforms 112. At block 404, the event detector 204 determines (e.g., makes a determination) whether on-demand media has been published. For example, in response to a notification from an RSS feed, the event detector 204 can determine that on-demand media has been published.

In the illustrated example of FIG. 4, in response to the event detector 204 not detecting on-demand media publication (block 404: NO), the process 400 returns to block 402 where the event detector 204 can continue to monitor for on-demand media publications. In response to the event detector 204 detecting on-demand media publication (block 404: YES), the process 400 proceeds to block 406, where the metadata collection controller 206 collects metadata associated with the on-demand media associated with a detected publication. For example, the metadata collection controller 206 can parse the RSS feed to identify metadata associated with the on-demand media. At block 408, the download controller 208 downloads the on-demand media. For example, the download controller 208 is configured to download the on-demand media from the on-demand media platform 112.

In the illustrated example of FIG. 4, at block 410, the signature generator 210 generates a number (e.g., n) of reference signatures representative of the on-demand media, as described above. At block 412, the signature generator 210 stores the n reference signatures in the data storage 218. At block 412, the metadata collection controller 206 determines whether to continue operating (e.g., to monitor for publication of other on-demand media to the monitored RSS feed(s)). In response to the metadata collection controller 206 determining to continue operating (block 412: YES), the process 400 returns to block 402. In response to the metadata collection controller 206 determining not to continue operating, (block 412: NO), the process 400 ends.

FIG. 5 is a flowchart representative of a process 500, which may be implemented utilizing machine-readable instructions that may be executed, to implement the example central facility 102 of FIGS. 1 and/or 2 to record download requests for on-demand media. The process 500 begins at block 502 where the event detector 204 monitors for on-demand media requests via an RSS redirect. At block 504, the event detector 204 determines whether a device has requested to download on-demand media (e.g., whether a device requesting on-demand media has been redirected). In response to the event detector 204 not detecting that a device has requested to download on-demand media (block 504: NO), the process 500 returns to block 502. In response to the event detector 204 detecting that a device has requested to download on-demand media (block 504: YES), the process 500 proceeds to block 506 where the download controller 208 records a download request corresponding to the on-demand media. Additionally or alternatively, at block 506, the download controller 208 records the IP address and/or user agent string associated with the device requesting to download on-demand media.

In the illustrated example of FIG. 5, at block 508, the download controller 208 determines whether to continue operating. In response to the download controller 208 determining to continue operating (block 508: YES), the process 500 returns to block 502. In response to the download controller 208 determining not to continue operating (block 508: NO), the process 500 ends.

FIG. 6 is a flowchart representative of a process 600, which may be implemented utilizing machine-readable instructions that may be executed, to implement the example central facility 102 of FIGS. 1 and/or 2 to identify on-demand media. The process 600 begins at block 602 where the panelist monitor controller 212 collects panelist information from one or more meters. At block 604, the event detector 204 monitors the one or more meters for sample signatures. At block 606, the event detector 204 determines whether the central facility 102 has received sample signatures from the one or more meters.

In the illustrated example of FIG. 6, in response to the event detector 204 determining that the central facility 102 has not received sample signatures (block 606: NO), the process 600 returns to block 604. In response to the event detector 204 determining that the central facility 102 has received sample signatures (block 606: YES), the process 600 proceeds to block 608 where the media matching controller 214 compares a first sample signature to the reference signatures at the data storage 218. At block 610, the media matching controller 214 determines whether the first sample signature matches any of the reference signatures stored at the data storage 218.

In the illustrated example of FIG. 6, in response to the media matching controller 214 determining that the first sample signature does not match any of the reference signatures (block 610: NO), the process 600 returns to block 604. In response to the media matching controller 214 determining that the first sample signature does match any of the reference signatures (block 610: YES), the process 600 proceeds to block 612 where the media matching controller 214 determines whether the central facility 102 has received additional sample signatures. In response to the media matching controller 214 determining that the central facility 102 has not received additional sample signatures (block 612: NO), the process 600 proceeds to block 622. In response to the media matching controller 214 determining that the central facility 102 has received additional sample signatures (block 612: YES), the process 600 proceeds to block 614 where the media matching controller 214 compares the next sample signature to the reference signatures stored at the data storage 218.

In the illustrated example of FIG. 6, at block 616, the media matching controller 214 determines whether the previous sample signature and the current sample signature are consecutive. For example, consecutive sample signatures can correspond to sequential timestamps of the sampled media. In response to the media matching controller 214 determining that the previous sample signature and the current sample signature are consecutive (block 616: YES), the process 600 proceeds to block 618 where the media matching controller 214 filters profiles at the data storage that do not include consecutive reference signatures. In response to the media matching controller 214 determining that the previous sample signature and the current sample signature are not consecutive (block 616: NO), the process 600 proceeds to block 620 where the media matching controller 214 filters profiles at the data storage that include consecutive reference signatures.

In the illustrated example of FIG. 6, at block 622, the media matching controller 214 identifies the on-demand media associated with the sample signature(s) based on the remaining reference signature(s). At block 624, the report generator 216 records an exposure (e.g., credits an exposure) corresponding to the on-demand media associated with the matching on-demand media profile. At block 626, the report generator 216 identifies the panelist and/or panelists associated with the sample signature and/or sample signatures that matched the on-demand media profile in the reference library.

In the illustrated example of FIG. 6, at block 628, based on the panelist(s) identified and the comparison to the reference library stored at the data storage 218, the report generator 216 determines metrics associated with the on-demand media. Example metrics associated with the on-demand media disclosed herein can include how many people were exposed to (e.g., listened to) the on-demand media, the demographic makeup of the audience, how much of the on-demand media was presented to the audience members (e.g., length of time the audience members played the on-demand media back, 40% of audience members were exposed to the first 20 minutes of the on-demand media, etc.), the types of devices at which the on-demand media was presented, among others.

In the illustrated example of FIG. 6, at block 630, the report generator 216 generates a report and/or reports including the metrics associated with the on-demand media. At block 632, the media matching controller 214 determines whether to continue operating. In response to the media matching controller 214 determining to continue operating (block 632: YES), the process 600 proceeds to block 604. In response to the media matching controller 214 determining not to continue operating (block 632: NO), the process 600 ends.

FIG. 7 is a flowchart representative of a process 700, which may be implemented utilizing machine-readable instructions that may be executed, to implement the example meter 300 of FIG. 3 to monitor on-demand media at a device. The example meter 300 is an example implementation of one or more of the example first meter 132*a*, the example second meter 132*b*, the example third meter 132*c*, and the example fourth meter 132*d* of FIG. 1. The process 700 begins at block 702 where the people identifier 312 collects panelist information.

In the illustrated example of FIG. 7, at block 704, the image sensor 302 monitors video presented at a panelist device (e.g., any one of the first media device 118, the second media device 120, the third media device 122, and the fourth media device 126). At block 706, the audio sensor 304 monitors audio presented at the panelist device (e.g., any one of the first media device 118, the second media device 120, the third media device 122, and the fourth media device 126). At block 708, the signature generator 306 generates sample signatures of the on-demand media presented at the panelist device. In examples in which the signature generator 306 generates sample signatures based on just the audio of the on-demand media, the processing at block 704 can be omitted. Likewise, in examples in which the signature generator 306 generates sample signatures based on just the video of the on-demand media, the processing at block 706 can be omitted. At block 710, the media measurement data controller 314 stores the sample signatures of the on-demand media at the data storage 316 of the meter 300. At block 712, the signature generator 306 determines whether there is additional on-demand media for which to generate signatures.

In the illustrated example of FIG. 7, in response to the signature generator 306 determining that there is additional on-demand media for which to generate signatures (block 712: YES), the process 700 returns to block 708. In response to the signature generator 306 determining that there is not additional on-demand media for which to generate signatures (block 712: NO), the process 700 proceeds to block 714. At block 714, the media measurement data controller 314 determines whether a backhaul trigger event has occurred.

In the illustrated example of FIG. 7, in response to the media measurement data controller 314 determining that a backhaul trigger event has not occurred (block 714: NO), the process 700 proceeds to block 718. In response to the media measurement data controller 314 determining that a backhaul trigger event has occurred (block 714: YES), the process 700 proceeds to block 716. At block 716, the media measurement data controller 314 transmits, via the network interface 308 and/or the communication processor 310, the sample signatures of the on-demand media and the panelist information to the central facility 102.

In the illustrated example of FIG. 7, the media measurement data controller 314 determines whether to continue operating. In response to the media measurement data controller 314 determining to continue operating (block 718: YES), the process 700 returns to 702. In response to the media measurement data controller 314 determining not to continue operating (block 718: NO), the process 700 ends.

Figure 8:
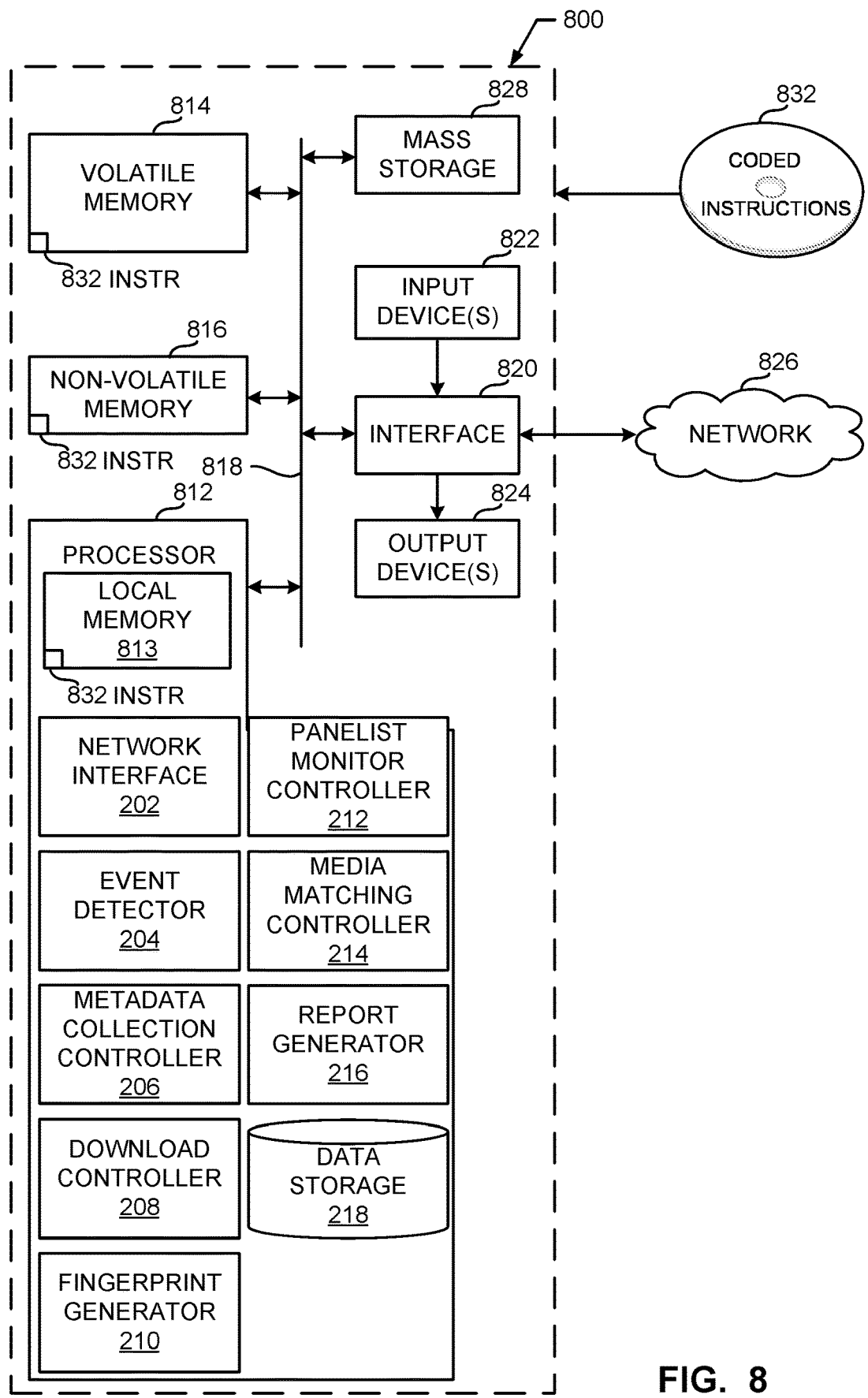
FIG. 8 is a block diagram of an example processing platform structured to execute the instructions of FIGS. 4, 5, and/or 6 to implement the example central facility of FIGS. 1 and 2.

FIG. 8 is a block diagram of an example processing platform 800 structured to execute the instructions of FIGS. 4, 5, and 6 to implement the example central facility 102 of FIGS. 1 and 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor 812 may be a semiconductor based (e.g., silicon based) device. In this example, the processor 812 implements the example network interface 202, the example event detector 204, the example metadata collection controller 206, the example download controller 208, the example signature generator 210, the example panelist monitor controller 212, the example media matching controller 214, the example report generator 216, the example data storage 218, and/or, more generally, the example central facility 102.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 4, 5, and 6 may be stored in the mass storage device 828, in the volatile memory 814, in the non-volatile memory 816, and/or on a removable non-transitory computer readable storage medium such as a CD or DVD.

Figure 9:
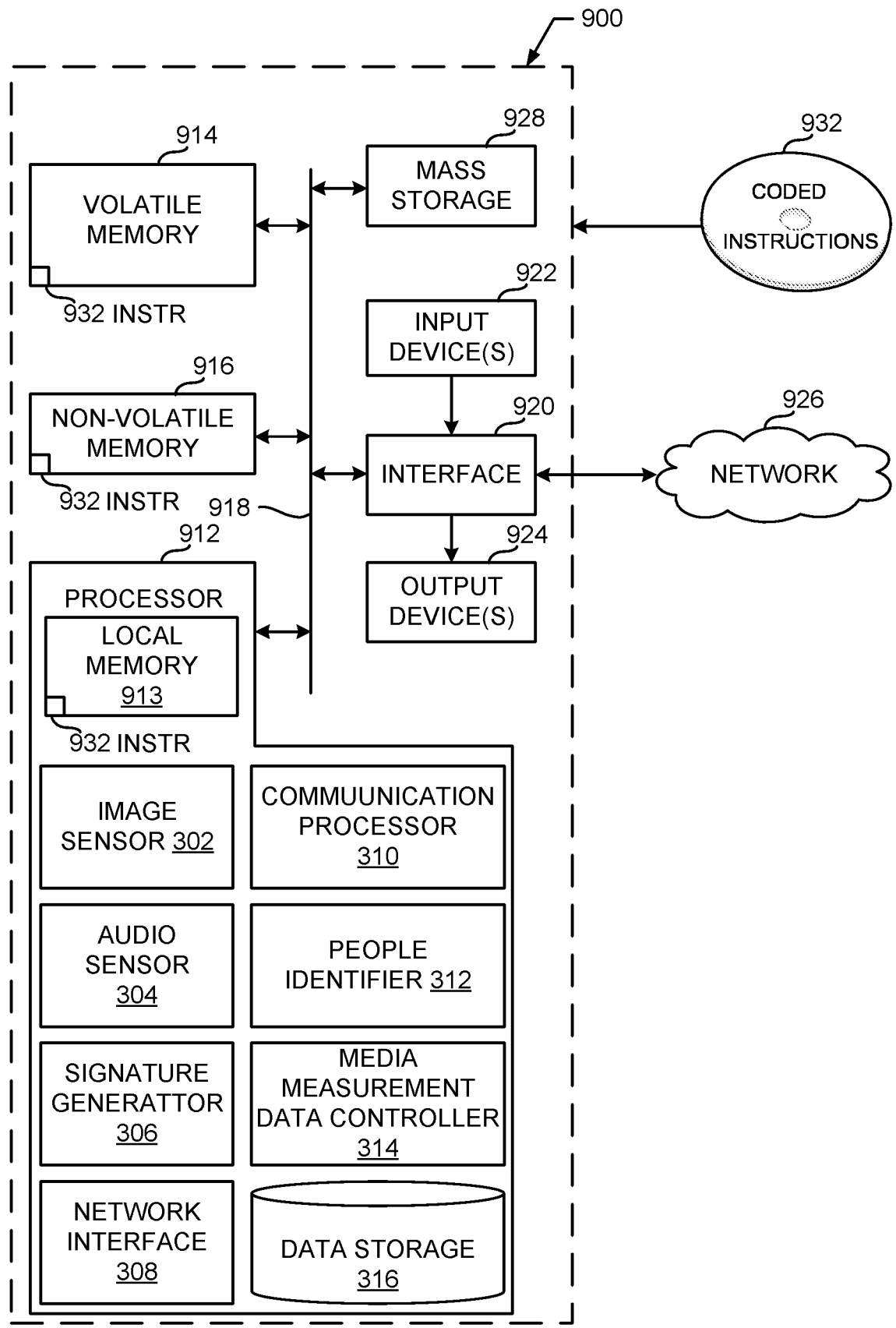
FIG. 9 is a block diagram of an example processing platform structured to execute the instructions of FIG. 7 to implement the example one or more meters of FIGS. 1 and 3.

FIG. 9 is a block diagram of an example processing platform 900 structured to execute the instructions of FIG. 7 to implement the example meter 300 of FIG. 3. The processor platform 900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor 912 may be a semiconductor based (e.g., silicon based) device. In this example, the processor 912 implements the example image sensor 302, the example audio sensor, the example signature generator 306, the example network interface 308, the example communication processor 310, the example people identifier 312, the example media measurement data controller 314, the example data storage 316, and/or, more generally, the meter 300.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 7 may be stored in the mass storage device 928, in the volatile memory 914, in the non-volatile memory 916, and/or on a removable non-transitory computer readable storage medium such as a CD or DVD.

Figure 10:
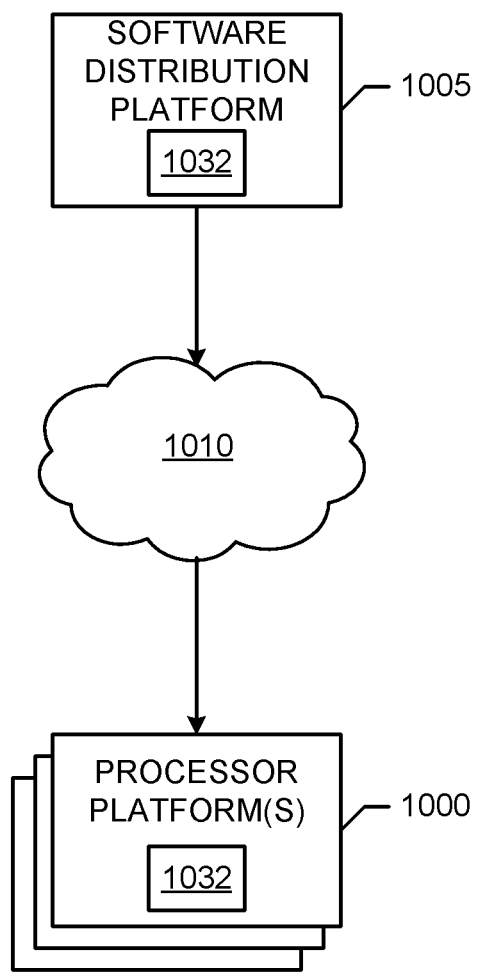
FIG. 10 is a block diagram of an example software distribution platform to distribute software (e.g., software corresponding to the example computer readable instructions of FIGS. 4, 5, 6, and 7) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1005 to distribute software such as the example computer readable instructions 832 of FIG. 8 and/or the example computer readable instructions 932 of FIG. 9 to third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 832 of FIG. 8 and/or the example computer readable instructions 932 of FIG. 9. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the computer readable instructions 1032, which may correspond to the example computer readable instructions 832 of FIGS. 8 and/or the example computer readable instructions 932 of FIG. 9, as described above. The one or more servers of the example software distribution platform 1005 are in communication with a network 1010, which may correspond to any one or more of the Internet and/or any of the example network 104 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1032 from the software distribution platform 1005. For example, the software, which may correspond to the example computer readable instructions 832 of FIG. 8 and/or the computer readable instructions 932 of FIG. 9, may be downloaded to the example processor platform 1000, which is to execute the computer readable instructions 1032 to implement the example central facility 102 and/or the example meter 300. In some example, one or more servers of the software distribution platform 1005 periodically offer, transmit, and/or force updates to the software (e.g., the example computer readable instructions 832 of FIG. 8 and/or the example computer readable instructions 932 of FIG. 9) to ensure improvements, patches, updates, etc. are distributed and applied to the software at the end user devices.

From the foregoing, it will be appreciated that example methods, apparatus and articles of manufacture have been disclosed that monitor on-demand media. The disclosed methods, apparatus, and articles of manufacture generate a reference library of on-demand media as the on-demand media is published. The disclosed methods, apparatus, and articles of manufacture improve the efficiency of using a computing device by reducing the number of computing cycles needed to identify on-demand media. For example, by making a reference library of on-demand media readily available, example methods, apparatus, and articles of manufacture disclosed herein improve the rate at which on-demand media is identified. The disclosed methods, apparatus and articles of manufacture are accordingly directed to one or more improvement(s) in the functioning of a computer.

Example methods, apparatus, systems, and articles of manufacture to monitor on-demand media are disclosed herein. Further examples and combinations thereof include the following:

Example 1 includes an apparatus comprising a metadata collection controller to collect metadata associated with on-demand media in response to publication of the on-demand media, a download controller to download the on-demand media, and a signature generator to generate one or more signatures representative of the on-demand media, and store a profile of the on-demand media in a data storage, the profile including the one or more signatures and the metadata associated with the on-demand media.

Example 2 includes the apparatus of example 1, wherein the metadata associated with the on-demand media includes at least one of a creator of the on-demand media, a title of the on-demand media, a genre of the on-demand media, an episode number associated with the on-demand media, a title of the episode associated with the on-demand media, a subject of the episode associated with the on-demand media, artwork associated with the on-demand media, a duration of the on-demand media, a platform at which the on-demand media is hosted, a location associated with the creator of the on-demand media, a time of publication of the on-demand media, a date of publication of the on-demand media, sponsors of the on-demand media, or information that identifies a guest in the episode associated with the on-demand media.

Example 3 includes the apparatus of example 1, further including an event detector to monitor a really simple syndication (RSS) feed associated with the on-demand media to detect the publication of the on-demand media, and detect a request from a media device to download the on-demand media via an RSS redirect.

Example 4 includes the apparatus of example 3, wherein the download controller is to credit a download request to the on-demand media in response to detection of the request.

Example 5 includes the apparatus of example 3, wherein the download controller is to download the on-demand media from an on-demand media platform that hosts the RSS feed.

Example 6 includes the apparatus of example 1, wherein the signatures are reference signatures, and further including a media matching controller to compare the reference signatures included in the profile of the on-demand media to one or more sample signatures obtained from a meter monitoring a panelist.

Example 7 includes the apparatus of example 6, further including a report generator to record an exposure corresponding to the on-demand media when one of more of the reference signatures included in the profile match the one or more sample signatures.

Example 8 includes a non-transitory computer readable storage medium comprising instructions which, when executed, cause at least one processor to at least collect metadata associated with on-demand media in response to publication of the on-demand media, download the on-demand media, and generate one or more signatures representative of the on-demand media, and store a profile of the on-demand media in a data storage, the profile including the one or more signatures and the metadata associated with the on-demand media.

Example 9 includes the computer readable storage medium of example 8, wherein the metadata associated with the on-demand media includes at least one of a creator of the on-demand media, a title of the on-demand media, a genre of the on-demand media, an episode number associated with the on-demand media, a title of the episode associated with the on-demand media, a subject of the episode associated with the on-demand media, artwork associated with the on-demand media, a duration of the on-demand media, a platform at which the on-demand media is hosted, a location associated with the creator of the on-demand media, a time of publication of the on-demand media, a date of publication of the on-demand media, sponsors of the on-demand media, or information that identifies a guest in the episode associated with the on-demand media.

Example 10 includes the computer readable storage medium of example 8, wherein the instructions, when executed, cause the at least one processor to monitor a really simple syndication (RSS) feed associated with the on-demand media to detect the publication of the on-demand media, and detect a request from a media device to download the on-demand media via an RSS redirect.

Example 11 includes the computer readable storage medium of example 10, wherein the instructions, when executed, cause the at least one processor to credit a download request to the on-demand media in response to detection of the request.

Example 12 includes the computer readable storage medium of example 10, wherein the instructions, when executed, cause the at least one processor to download the on-demand media from an on-demand media platform that hosts the RSS feed.

Example 13 includes the computer readable storage medium of example 8, wherein the signatures are reference signatures, and wherein the instructions, when executed, cause the at least one processor to compare the reference signatures included in the profile of the on-demand media to one or more sample signatures obtained from a meter monitoring a panelist.

Example 14 includes the computer readable storage medium of example 13, wherein the instructions, when executed, cause the at least one processor to record an exposure corresponding to the on-demand media when one of more of the reference signatures included in the profile match the one or more sample signatures.

Example 15 includes an apparatus comprising means for collecting metadata to collect metadata associated with on-demand media in response to publication of the on-demand media, means for controlling audience measurement entity downloads to download the on-demand media, and means for signature generating to generate one or more signatures representative of the on-demand media, and store a profile of the on-demand media in a data storage, the profile including the one or more signatures and the metadata associated with the on-demand media.

Example 16 includes the apparatus of example 15, wherein the metadata associated with the on-demand media includes at least one of a creator of the on-demand media, a title of the on-demand media, a genre of the on-demand media, an episode number associated with the on-demand media, a title of the episode associated with the on-demand media, a subject of the episode associated with the on-demand media, artwork associated with the on-demand media, a duration of the on-demand media, a platform at which the on-demand media is hosted, a location associated with the creator of the on-demand media, a time of publication of the on-demand media, a date of publication of the on-demand media, sponsors of the on-demand media, or information that identifies a guest in the episode associated with the on-demand media.

Example 17 includes the apparatus of example 15, further including means for detecting an event to monitor a really simple syndication (RSS) feed associated with the on-demand media to detect the publication of the on-demand media, and detect a request from a media device to download the on-demand media via an RSS redirect.

Example 18 includes the apparatus of example 17, wherein the means for controlling audience measurement entity downloads is to credit a download request to the on-demand media in response to detection of the request.

Example 19 includes the apparatus of example 17, wherein the means for controlling audience measurement entity downloads is to download the on-demand media from an on-demand media platform that hosts the RSS feed.

Example 20 includes the apparatus of example 15, wherein the signatures are reference signatures, and further including means for matching media to compare the reference signatures included in the profile of the on-demand media to one or more sample signatures obtained from a meter monitoring a panelist.

Example 21 includes the apparatus of example 20, further including means for generating reports to record an exposure corresponding to the on-demand media when one of more of the reference signatures included in the profile match the one or more sample signatures.

Example 22 includes a method comprising collecting metadata associated with on-demand media in response to publication of the on-demand media, downloading the on-demand media, and generating one or more signatures representative of the on-demand media, and storing a profile of the on-demand media in a data storage, the profile including the one or more signatures and the metadata associated with the on-demand media.

Example 23 includes the method of example 22, wherein the metadata associated with the on-demand media includes at least one of a creator of the on-demand media, a title of the on-demand media, a genre of the on-demand media, an episode number associated with the on-demand media, a title of the episode associated with the on-demand media, a subject of the episode associated with the on-demand media, artwork associated with the on-demand media, a duration of the on-demand media, a platform at which the on-demand media is hosted, a location associated with the creator of the on-demand media, a time of publication of the on-demand media, a date of publication of the on-demand media, sponsors of the on-demand media, or information that identifies a guest in the episode associated with the on-demand media.

Example 24 includes the method of example 22, further including monitoring a really simple syndication (RSS) feed associated with the on-demand media to detect the publication of the on-demand media, and detecting a request from a media device to download the on-demand media via an RSS redirect.

Example 25 includes the method of example 24, further including crediting a download request to the on-demand media in response to detection of the request.

Example 26 includes the method of example 24, further including downloading the on-demand media from an on-demand media platform that hosts the RSS feed.

Example 27 includes the method of example 22, wherein the signatures are reference signatures, and further including comparing the reference signatures included in the profile of the on-demand media to one or more sample signatures obtained from a meter monitoring a panelist.

Example 28 includes the method of example 27, further including recording an exposure corresponding to the on-demand media when one of more of the reference signatures included in the profile match the one or more sample signatures.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:
1. A computing system comprising:
a processor; and
a non-transitory computer-readable storage medium, having stored thereon program instructions that, upon execution by the processor, cause performance of a set of operations comprising:
detecting publication of on-demand media;
generating, in response to detection of the publication of the on-demand media, one or more reference signatures for the on-demand media;
collecting reference metadata associated with the on-demand media;
generating a reference profile for the on-demand media, wherein the reference profile comprises including the one or more reference signatures and the reference metadata;
populating a reference library with the reference profile for the on-demand media;
collecting a first sample signature generated at a media presentation environment;
collecting a second sample signature generated at the media presentation environment;
determining that the second sample signature is consecutive to the first sample signature;
determining an exposure for the on-demand media based on a match between the first sample signature and the one or more reference signatures and the second sample signature and the one or more reference signatures;
and
outputting a report including the exposure of the on-demand media.

2. The computing system of claim 1, the set of operations further comprising:
  downloading a copy of the on-demand media; and
  generating the one or more reference signatures based on the copy of the on-demand media.

3. The computing system of claim 1, the set of operations further comprising:
  collecting the reference metadata from a really simple syndication feed that is configured to host the on-demand media.

4. The computing system of claim 1, wherein the reference metadata comprises at least one of: a creator of the on-demand media, a first title of the on-demand media, a genre of the on-demand media, an episode number associated with the on-demand media, a second title of the episode associated with the on-demand media, a subject of the episode associated with the on-demand media, artwork associated with the on-demand media, a duration of the on-demand media, a platform at which the on-demand media is hosted, a location associated with the creator of the on-demand media, a time of publication of the on-demand media, a date of publication of the on-demand media, sponsors of the on-demand media, or information that identifies a guest in the episode associated with the on-demand media.

5. The computing system of claim 1, the set of operations further comprising:
  recording a download request corresponding to the on-demand media based on detection of a request to download the on-demand media, wherein the download request comprises at least one of an internet protocol address of a device that issued the request to download the on-demand media or a user agent string associated with the device.

6. The computing system of claim 1, wherein the wherein the report comprises one or more audience metrics associated with the media presentation environment; and wherein an audience metric of the one or more audience metrics is a length of exposure based on at least the first sample signature and the second sample signature.

7. The computing system of claim 1, wherein the on-demand media comprises at least one of; a portion of a podcast, a standalone story, a clip, music, or a video.

8. A non-transitory computer-readable storage medium, having stored thereon program instructions that, upon execution by a processor, cause performance of a set of operations comprising:
  detecting publication of on-demand media;
  generating, in response to detection of the publication of the on-demand media, one or more reference signatures for the on-demand media;
  collecting reference metadata associated with the on-demand media; generating a reference profile for the on-demand media, wherein the reference profile comprises the one or more reference signatures and the reference metadata;
  populating a reference library with the reference profile for the on-demand media;
  collecting a first sample signature generated at a media presentation environment;
  collecting a second sample signature generated at the media presentation environment;
  determining that the second sample signature is consecutive to the first sample signature;
  determining an exposure for the on-demand media based on a match between the first sample signature and the one or more reference signatures and the second sample signature and the one or more reference signatures; and
  outputting a report including the exposure of the on-demand media.

9. The non-transitory computer-readable storage medium of claim 8, the set of operations further comprising:
  downloading a copy of the on-demand media; and
  generating the one or more reference signatures based on the copy of the on-demand media.

10. The non-transitory computer-readable storage medium of claim 8, the set of operations further comprising:
  collecting the reference metadata from a really simple syndication feed that is configured to host the on-demand media.

11. The non-transitory computer-readable storage medium of claim 8, wherein the reference metadata comprises at least one of: a creator of the on-demand media, a first title of the on-demand media, a genre of the on-demand media, an episode number associated with the on-demand media, a second title of the episode associated with the on-demand media, a subject of the episode associated with the on-demand media, artwork associated with the on-demand media, a duration of the on-demand media, a platform at which the on-demand media is hosted, a location associated with the creator of the on-demand media, a time of publication of the on-demand media, a date of publication of the on-demand media, sponsors of the on-demand media, or information that identifies a guest in the episode associated with the on-demand media.

12. The non-transitory computer-readable storage medium of claim 8, the set of operations further comprising:
  recording a download request corresponding to the on-demand media based on detection of a request to download the on-demand media, wherein the download request comprises at least one of an internet protocol address of a device that issued the request to download the on-demand media or a user agent string associated with the device.

13. The non-transitory computer-readable storage medium of claim 8, wherein the report comprises one or more audience metrics associated with the media presentation environment; and wherein an audience metric of the one or more audience metrics is a length of exposure based on at least the first sample signature and the second sample signature.

14. The non-transitory computer-readable storage medium of claim 8, wherein the on-demand media comprises at least one of; a portion of a podcast, a standalone story, a clip, music, or a video.

15. A method comprising:
  populating, in response to publication of on-demand media, a reference library with a reference profile for the on-demand media by:
    generating, by executing an instruction with a processor, one or more reference signatures for the on-demand media;
    collecting, by executing an instruction with the processor, reference metadata associated with the on-demand media; and
    associating, by executing an instruction with the processor, the one or more reference signatures and the reference metadata in the reference library to generate the reference profile;
  collecting, by executing an instruction with the processor, a first sample signature generated at a media presentation environment;

collecting, by executing an instruction with the processor, a second sample signature generated at the media presentation environment;

determining that the second sample signature is consecutive to the first sample signature;

determining, by executing an instruction with the processor, an exposure for the on-demand media based on a match between the first sample signature and the one or more reference signatures and the second sample signature and the one or more reference signatures; and outputting a report including the exposure of the on-demand media.

16. The method of claim 15, further comprising:
downloading a copy of the on-demand media; and
generating the one or more reference signatures based on the copy of the on-demand media.

17. The method of claim 15, further comprising:
collecting the reference metadata from a really simple syndication feed that is configured to host the on-demand media.

18. The method of claim 15, wherein the reference metadata comprises at least one of; a creator of the on-demand media, a first title of the on-demand media, a genre of the on-demand media, an episode number associated with the on-demand media, a second title of the episode associated with the on-demand media, a subject of the episode associated with the on-demand media, artwork associated with the on-demand media, a duration of the on-demand media, a platform at which the on-demand media is hosted, a location associated with the creator of the on-demand media, a time of publication of the on-demand media, a date of publication of the on-demand media, sponsors of the on-demand media, or information that identifies a guest in the episode associated with the on-demand media.

19. The method of claim 15, further comprising:
recording a download request corresponding to the on-demand media based on detection of a request to download the on-demand media, wherein the download request comprises at least one of an internet protocol address of a device that issued the request to download the on-demand media or user agent string associated with the device.

20. The method of claim 15,
wherein the report comprises one or more audience metrics associated with the media presentation environment; and wherein an audience metric of the one or more audience metrics is a length of exposure based on at least the first sample signature and the second sample signature.

21. The method of claim 15, wherein the on-demand media includes comprises at least one of a portion of a podcast, a standalone story, a clip, music, or a video.

* * * * *